(12) United States Patent
Ahn et al.

(10) Patent No.: US 12,176,581 B2
(45) Date of Patent: Dec. 24, 2024

(54) BATTERY PACK

(71) Applicant: Samsung SDI Co., Ltd., Yongin-si (KR)

(72) Inventors: Byungkook Ahn, Yongin-si (KR); Changyong Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 208 days.

(21) Appl. No.: 17/452,892

(22) Filed: Oct. 29, 2021

(65) Prior Publication Data

US 2022/0140454 A1 May 5, 2022

(30) Foreign Application Priority Data

Nov. 2, 2020 (KR) .................. 10-2020-0144586

(51) Int. Cl.
*H01M 50/569* (2021.01)
*H01M 10/48* (2006.01)
*H01M 10/613* (2014.01)
*H01M 10/643* (2014.01)
*H01M 10/6554* (2014.01)
*H01M 50/20* (2021.01)
*H01M 50/213* (2021.01)
*H01M 50/284* (2021.01)
*H01M 50/471* (2021.01)
(Continued)

(52) U.S. Cl.
CPC ....... *H01M 50/569* (2021.01); *H01M 10/482* (2013.01); *H01M 10/486* (2013.01); *H01M 10/613* (2015.04); *H01M 10/643* (2015.04); *H01M 10/6554* (2015.04); *H01M 50/20* (2021.01); *H01M 50/213* (2021.01); *H01M 50/284* (2021.01); *H01M 50/471* (2021.01); *H01M 50/502* (2021.01); *H01M 50/509* (2021.01); *H01M 50/512* (2021.01)

(58) Field of Classification Search
None
See application file for complete search history.

(56) References Cited

U.S. PATENT DOCUMENTS

| 10,439,180 | B2 | 10/2019 | Kwag |
| 10,811,734 | B2 | 10/2020 | Gong et al. |

(Continued)

FOREIGN PATENT DOCUMENTS

| JP | 5593591 B2 | 8/2014 |
| KR | 10-2016-0138994 A | 12/2016 |

(Continued)

OTHER PUBLICATIONS

Korean Office action issued in corresponding application No. KR 10-2020-0144586, dated Jul. 25, 2022, 18 pages.

*Primary Examiner* — Ula C Ruddock
*Assistant Examiner* — Mary Grace Byram
(74) *Attorney, Agent, or Firm* — Lewis Roca Rothgerber Christie LLP

(57) ABSTRACT

A battery pack includes: a first battery cell; a circuit board electrically connected to the first battery cell and extending along a first axis, a first surface of the circuit board facing the first battery cell; a first connection tab protruding from the first surface of the circuit board toward the first battery cell along a second axis crossing the first axis; and a detection connection member connecting the first connection tab to the first battery cell.

19 Claims, 14 Drawing Sheets

(51) Int. Cl.
*H01M 50/502* (2021.01)
*H01M 50/509* (2021.01)
*H01M 50/512* (2021.01)

(56) References Cited

U.S. PATENT DOCUMENTS

| | | | |
|---|---|---|---|
| 11,223,076 B2 | 1/2022 | Jeong et al. | |
| 2010/0047676 A1* | 2/2010 | Park | H01M 50/271 |
| | | | 429/93 |
| 2012/0070699 A1* | 3/2012 | Imaizumi | H01M 10/425 |
| | | | 361/752 |
| 2012/0161677 A1* | 6/2012 | Kunimitsu | H01M 50/284 |
| | | | 320/134 |
| 2012/0308849 A1* | 12/2012 | Tortstensson | H01M 50/503 |
| | | | 429/7 |
| 2013/0236745 A1* | 9/2013 | Norton | H01M 10/6555 |
| | | | 429/7 |
| 2017/0125757 A1* | 5/2017 | Kwag | H01M 10/425 |
| 2020/0227698 A1* | 7/2020 | Muratsu | H01M 50/213 |

FOREIGN PATENT DOCUMENTS

| | | |
|---|---|---|
| KR | 10-2017-0052327 | 5/2017 |
| KR | 10-2018-0088197 A | 8/2018 |

\* cited by examiner

BATTERY PACK

CROSS-REFERENCE TO RELATED APPLICATION

This application claims priority to and the benefit of Korean Patent Application No. 10-2020-0144586, filed on Nov. 2, 2020, in the Korean Intellectual Property Office, the disclosure of which is incorporated by reference herein in its entirety.

BACKGROUND

1. Field

Aspects of embodiments of the present disclosure relate to a battery pack.

2. Description of the Related Art

In general, secondary batteries are designed to be charged or discharged, unlike primary batteries that are not designed to be charged (or recharged). Secondary batteries may be used as energy sources for mobile devices, electric vehicles, hybrid vehicles, electric bicycles, uninterruptible power supplies, etc. and may be used in the form of a single battery or used in the form of a module in which multiple batteries are connected to each other to be bundled as a unit depending on the type of external devices to be applied (e.g., to be powered).

SUMMARY

An embodiment of the present disclosure includes a battery pack having an improved sensing structure for obtaining state information of battery cells, such as voltages, currents, and temperatures of the battery cells.

Additional aspects and features of the present disclosure will be set forth, in part, in the description which follows and, in part, will be apparent from the description or may be learned by practice of the presented embodiments of the disclosure.

A battery pack according to an embodiment of the present disclosure includes a first battery cell; a circuit board electrically connected to the first battery cell and extending along a first axis, a first surface of the circuit board facing the first battery cell; a first connection tab protruding from the first surface of the circuit board toward the first battery cell along a second axis crossing the first axis; and a detection connection member connecting the first connection tab to the first battery cell.

In some embodiments, the first connection tab may have a fixing surface coupled to the first surface of the circuit board and a coupling surface contacting (or extending from) the fixing surface at one edge and being an uppermost surface of the first connection tab along a third axis. The first battery cell may extend in the third axis.

In some embodiments, the circuit board may be vertically arranged along a third axis in which the first battery cell extends.

In some embodiments, the detection connection member may have one end portion bonded to the first connection tab and another end portion bonded to a first bus bar connected to the first battery cell.

In some embodiments, the first bus bar may be on the first battery cell along a third axis in which the first battery cell extends, and the first connection tab may be connected to a tab mounting portion of the circuit board which protrudes upwardly along the third axis.

In some embodiments, the first battery cell may include a plurality of (or multiple) first battery cells arranged in a zigzag pattern along the second axis from a position adjacent to the first surface of the circuit board, and the first bus bar may connect, in parallel, the first battery cells arranged in the zigzag pattern along the second axis to form a first parallel module.

In some embodiments, the first parallel module may include: first and second parallel connections that connect, in parallel, ones of the first battery cells in a preceding row to other ones of the first battery cells in a following row along the second axis; and a third parallel connection that connects, in parallel, ones of the first battery cells in the same row along the first axis.

In some embodiments, different first parallel modules connected to the circuit board through different detection connection members may be arranged at different positions along the first axis.

In some embodiments, different first parallel modules arranged along the first axis may be connected, in series, to each other.

In some embodiments, the battery pack may further include: a second battery cell facing the first battery cell; a second connection tab protruding from a second surface of the circuit board, the second surface may be opposite to the first surface of the circuit board, toward the second battery cell along the second axis; and an additional detection connection member connecting the second connection tab to the second battery cell.

In some embodiments, the circuit board may be upright between the first and second battery cells, and the first and second connection tabs may protrude from the first and second surfaces of the circuit board toward the first and second battery cells in opposite directions.

In some embodiments, the first and second connection tabs may be connected to different positions of the circuit board along the first axis.

In some embodiments, the additional detection connection member may have one end portion bonded to the second connection tab and another end portion bonded to a second bus bar connected to the second battery cell.

In some embodiments, the battery pack may further include a cell holder into which the first and second battery cells are fitted, and the cell holder may include a board assembly rib for fixing a position of the circuit board.

In some embodiments, the cell holder may have slits that each expose a tab mounting portion of the circuit board to which the first and second connection tabs are connected and are formed at positions away from each other along the first axis. The board assembly rib and the slits may be formed at alternating positions along the first axis.

In some embodiments, the cell holder may further include first and second tap openings that extend from the slits along the first and second connection tabs opposite to each other along the second axis to expose the first and second connection tabs.

In some embodiments, the first and second tap openings may be formed at different positions in the slits along the first axis.

In some embodiments, the battery pack may further include a thermistor for selectively detecting temperature information of the first battery cell among the first and second battery cells may be connected to the circuit board, and the circuit board may be between the first and second battery cells.

In some embodiments, the thermistor may be provided at a height relatively close to an upper end portion of the circuit board and relatively far from a lower end portion of the circuit board along a third axis along which the first battery cell extends.

In some embodiments, the battery pack may further include a cooling plate configured to cool the first battery cell. The cooling plate may be arranged at a height relatively close to the lower end portion of the circuit board and relatively far from the upper end portion along the third axis.

BRIEF DESCRIPTION OF THE DRAWINGS

The above and other aspects and features of embodiments of the present disclosure will be more apparent from the following description, taken in conjunction with the accompanying drawings, in which.

DETAILED DESCRIPTION

Figure 1:
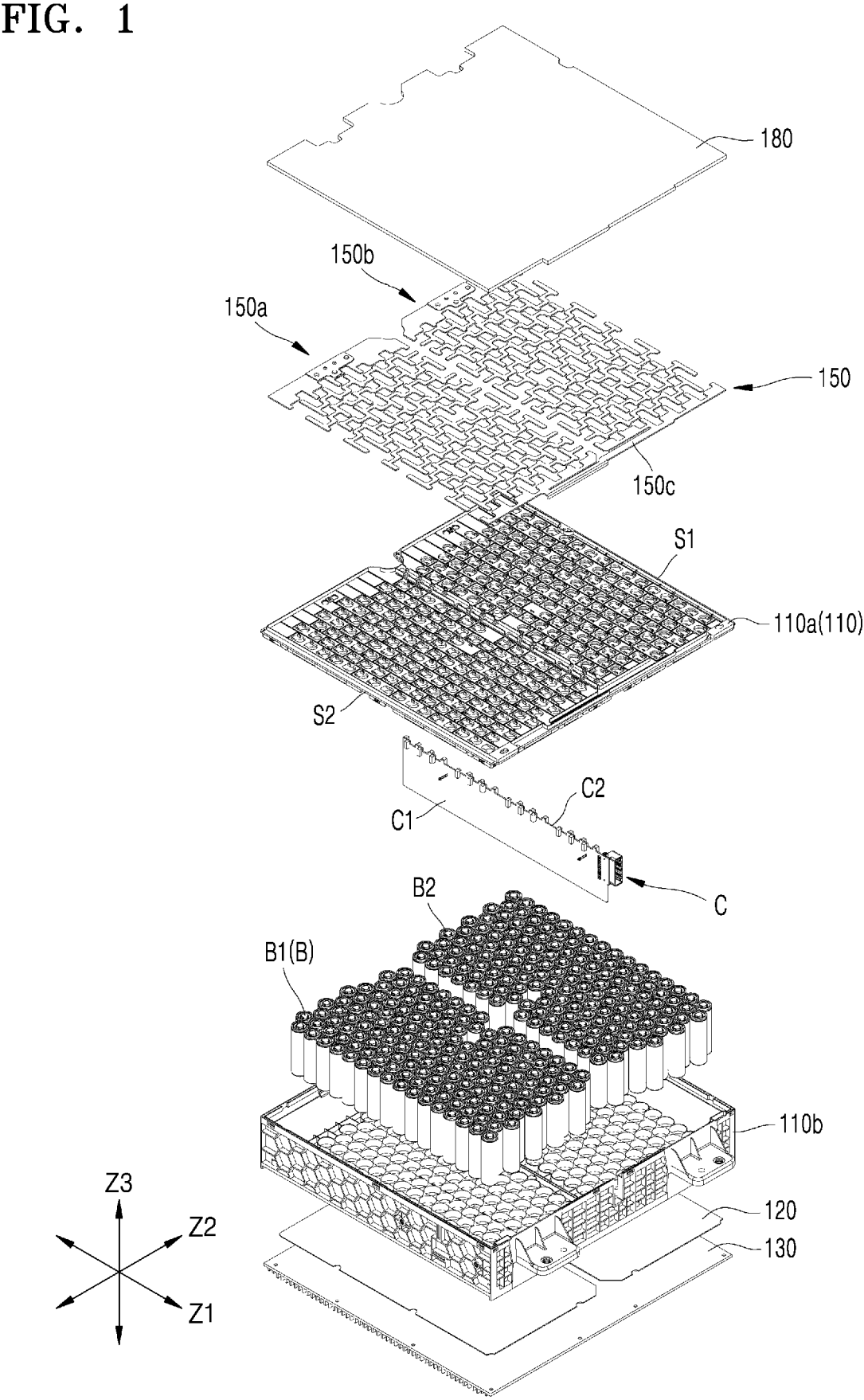
FIG. 1 is an exploded perspective view of a battery pack according to an embodiment of the present disclosure.

Reference will now be made in detail to embodiments, examples of which are illustrated in the accompanying drawings, wherein like reference numerals refer to like elements throughout. The present embodiments may have different forms and the present disclosure should not be construed as being limited to the descriptions set forth herein. Accordingly, the embodiments are merely described below, by referring to the figures, to explain aspects of the present description.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present disclosure and is not intended to be limiting of the described example embodiments of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a battery pack according to an embodiment of the present disclosure will be described with reference to the accompanying drawings.

Figure 2:
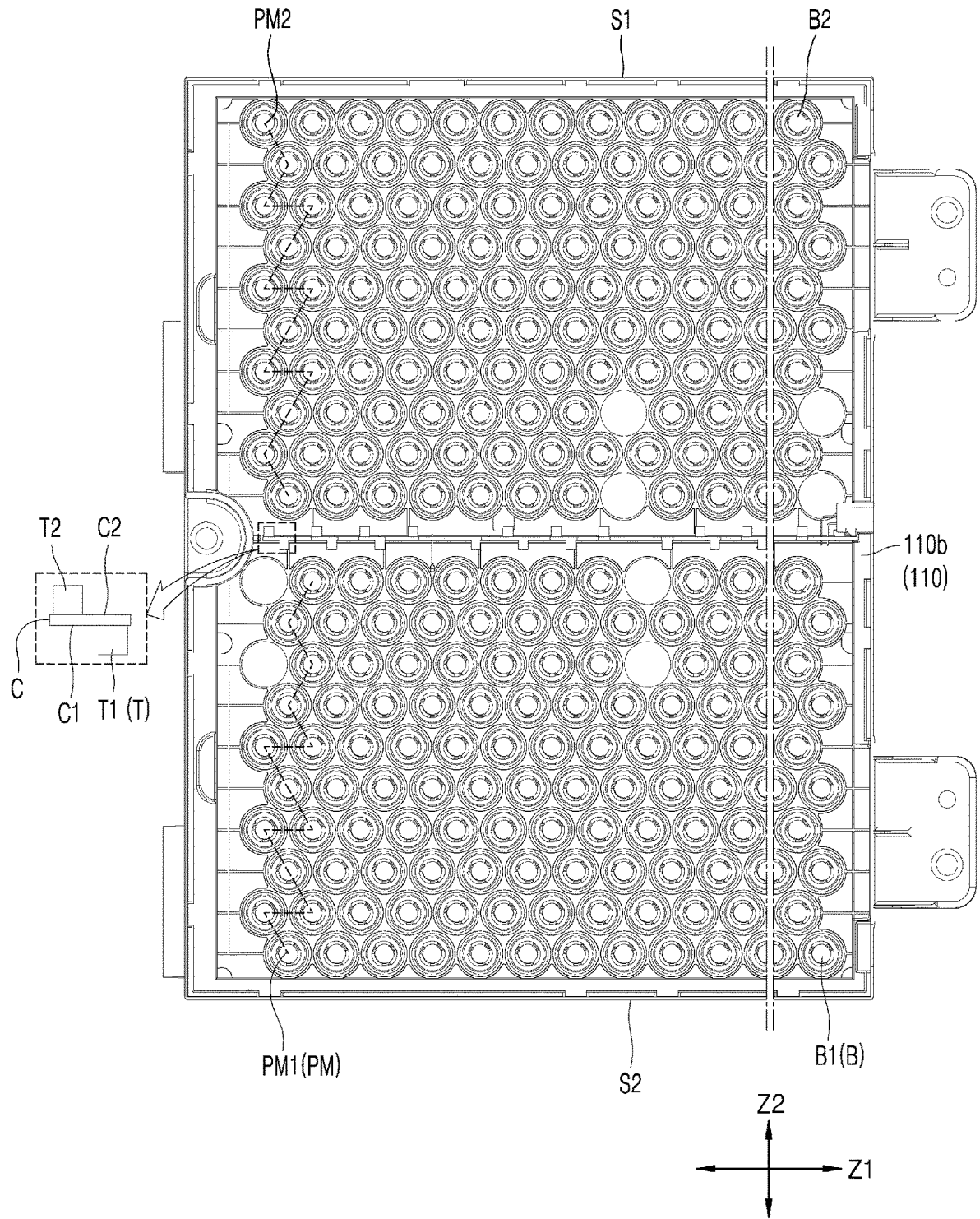
FIG. 2 is a view illustrating an arrangement of battery cells in FIG. 1.
Figure 3:
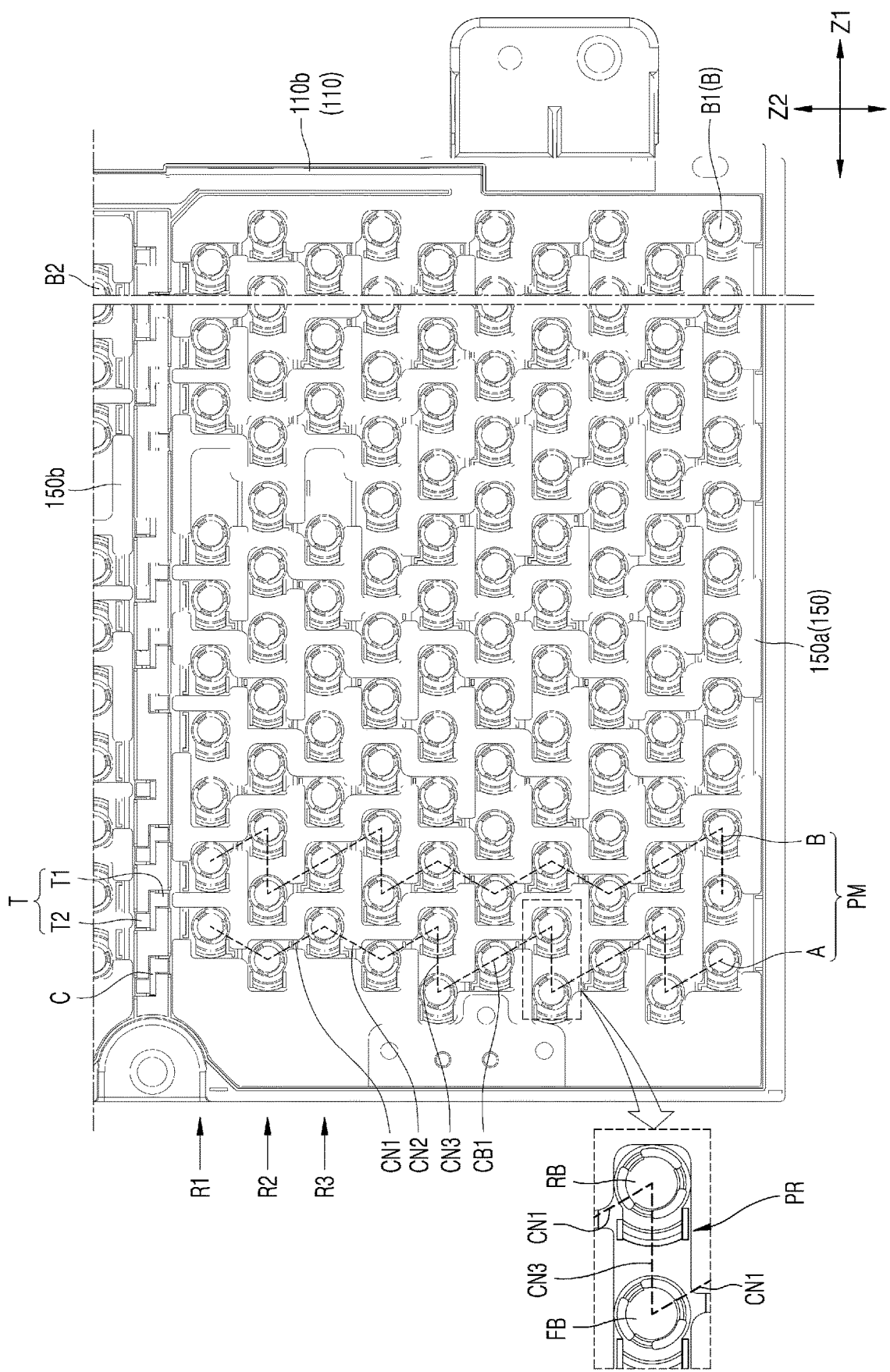
FIGS. 3 and 4 are views illustrating connections of the battery cells in FIG. 2.
Figure 4:
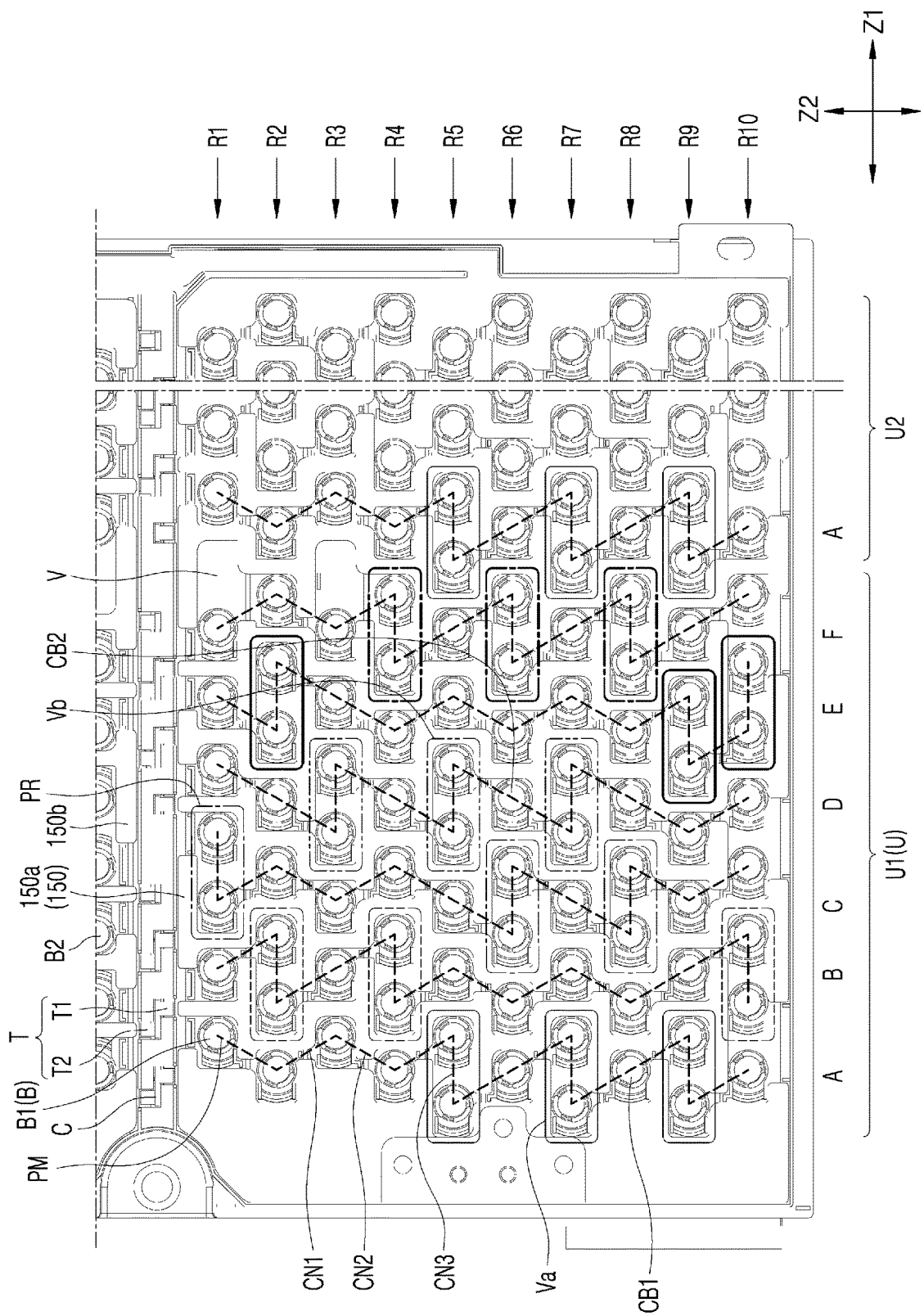
Figure 5A:
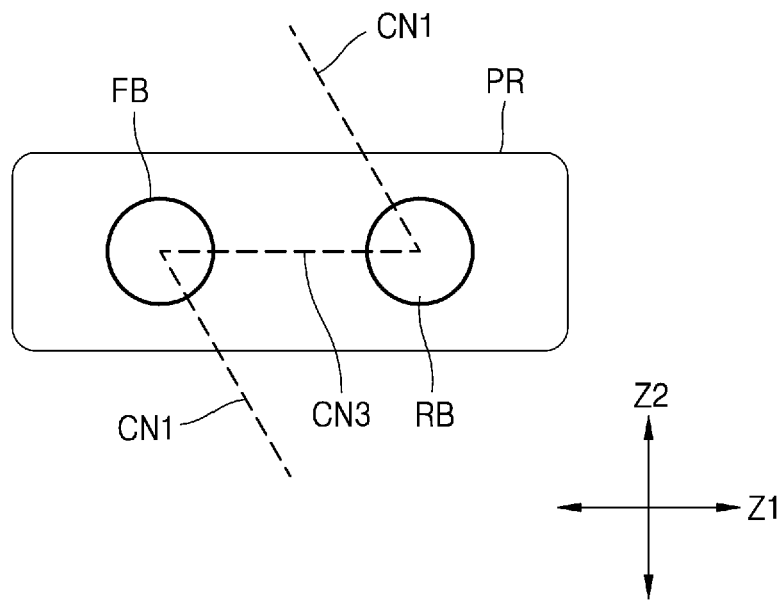
FIGS. 5A and 5B are views illustrating connections of battery cells of Va and Vb in FIG. 4.
Figure 5B:
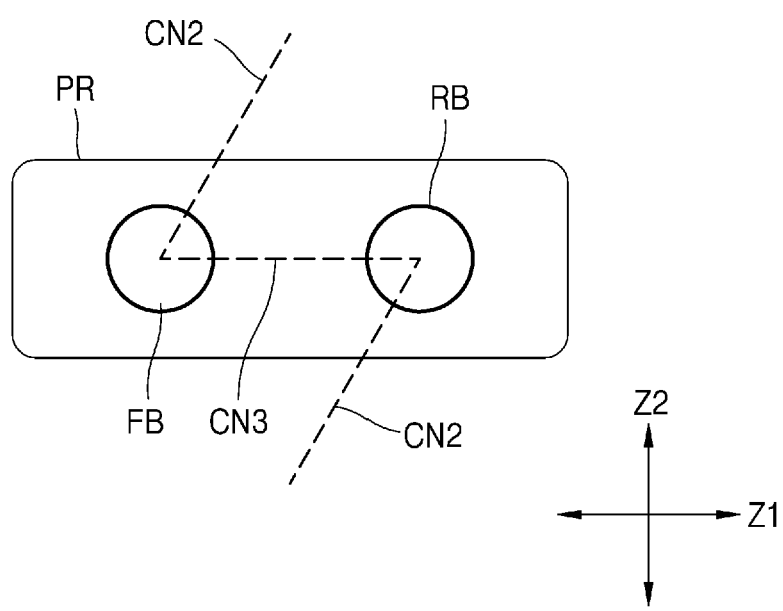
Figure 6A:
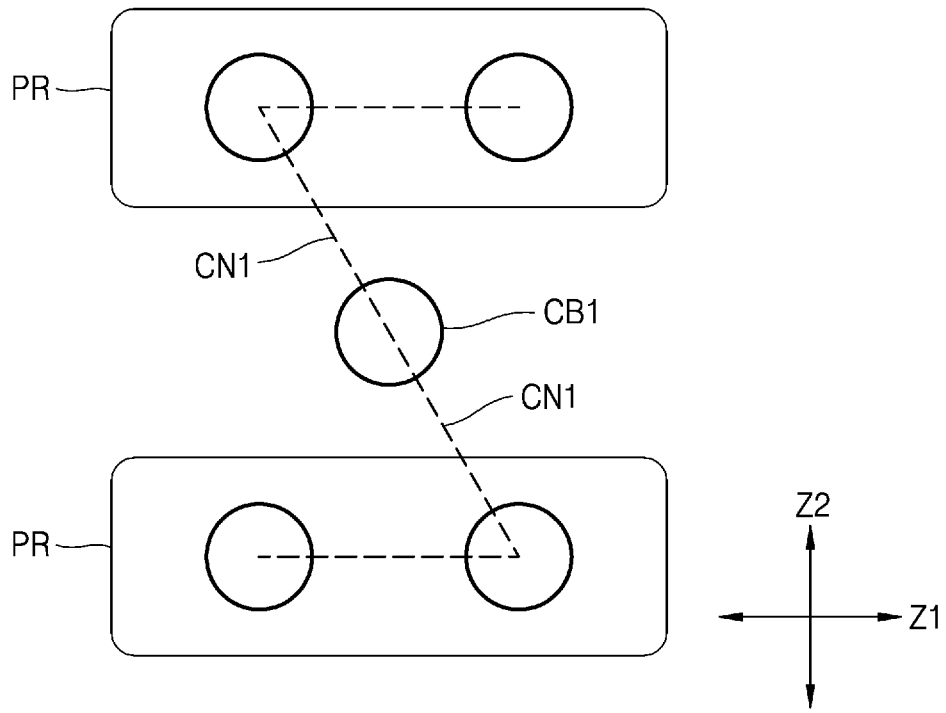
FIGS. 6A and 6B are views illustrating connections of first and second position correction cells in FIG. 4.
Figure 6B:
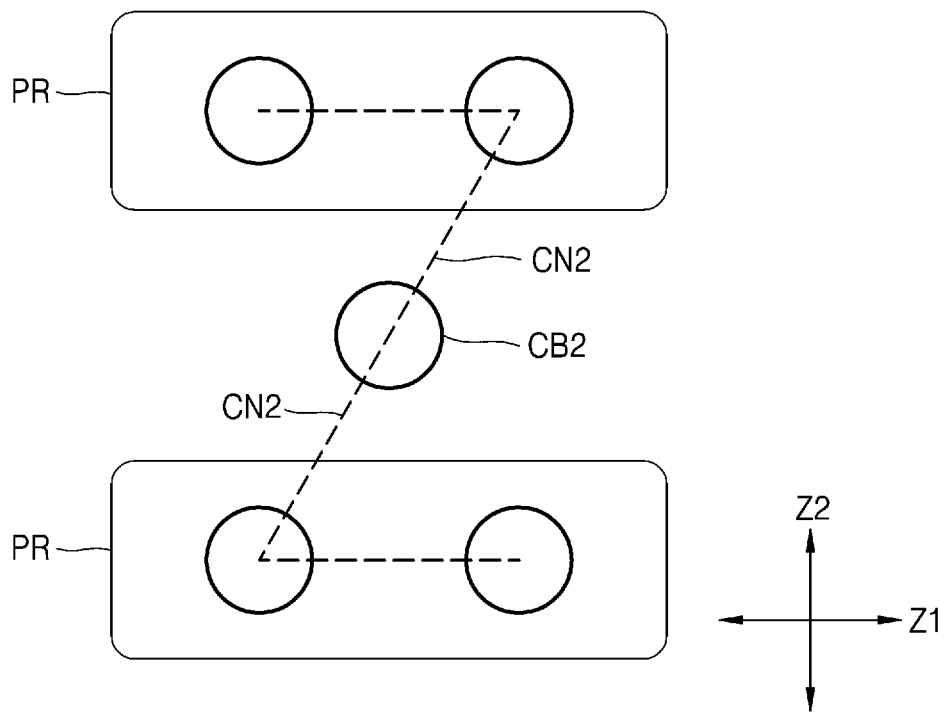
Figure 7:
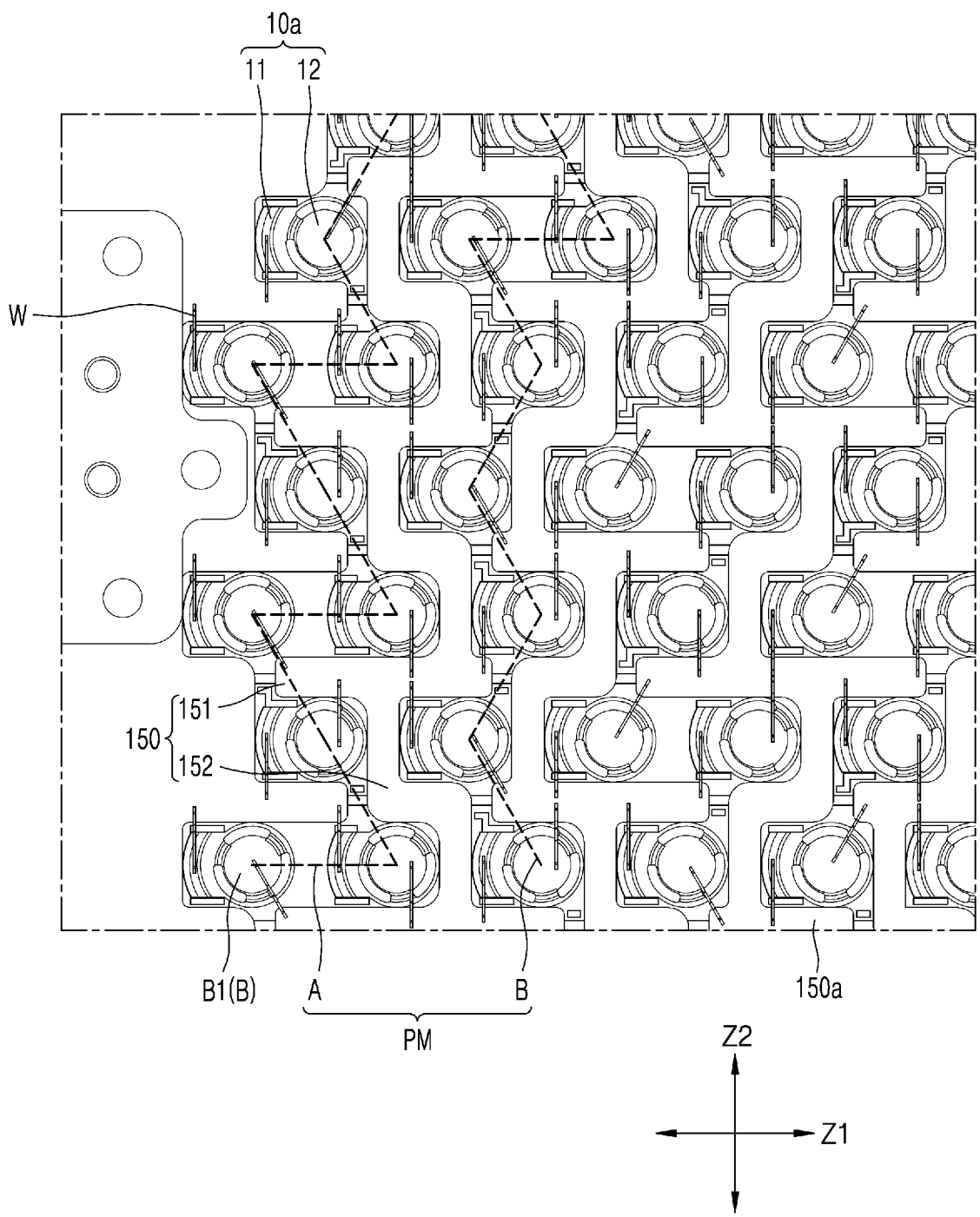
FIG. 7 is a view illustrating connection members that connect battery cells to bus bars in FIG. 4.
Figure 8:
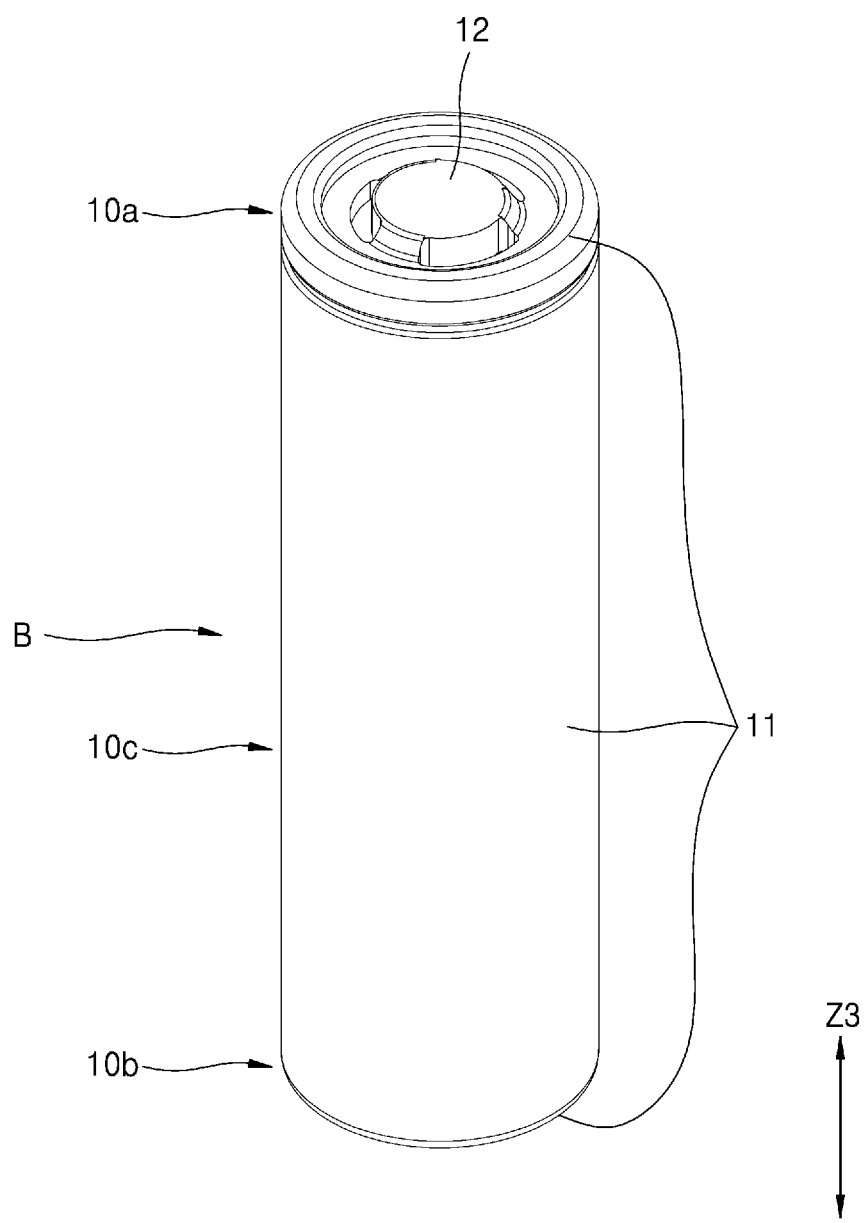
FIG. 8 is a perspective view illustrating a battery cell shown in FIG. 4.

FIG. 1 is an exploded perspective view of a battery pack according to an embodiment of the present disclosure; FIG. 2 is a view illustrating an arrangement of battery cells shown in FIG. 1; FIGS. 3 and 4 are views illustrating connections of the battery cells shown in FIG. 2; FIGS. 5A and 5B are views illustrating connections of battery cells of Va and Vb shown in FIG. 4; FIGS. 6A and 6B are views illustrating connections of first and second position correction cells shown in FIG. 4; FIG. 7 is a view illustrating connection members that connect battery cells to bus bars shown in FIG. 4; and FIG. 8 is a perspective view illustrating a battery cell shown in FIG. 4.

Referring to FIGS. 1 to 4, a battery pack according to an embodiment of the present disclosure may include a circuit board C between a group of first battery cells B1 and a group of second battery cells B2. In one embodiment of the present disclosure, the group of first battery cells B1 may include multiple (a plurality of) first battery cells B1 arranged in a row in (or along) a first axis Z1 in which the circuit board C extends at a first surface C1 side of the circuit board C. Similarly, the group of second battery cells B2 may include multiple second battery cells B2 arranged in a row in the first axis Z1 in which the circuit board C extends at a second surface C2 side of the circuit board C. In some embodiments, the first and second surfaces C1 and C2 of the circuit board C may be opposite to each other, and the first and second surfaces C1 and C2 may be main surfaces occupying (or forming) the largest area in the circuit board C. In addition, the group of first battery cells B1 being arranged on the first surface C1 side of the circuit board C may indicate that the group of first battery cells B1 is arranged in a position directly facing the first surface C1 from among the first and second surfaces of the circuit board C, and similarly, the group of second battery cells B1 being arranged on the second surface C2 side of the circuit board C may indicate that the group of second battery cells B1 is arranged in a position directly facing the second surface C2 from among the first and second surfaces of the circuit board C. For example, the group of first battery cells B1 may be arranged opposite to the group of second battery cells B2 with the circuit board C interposed therebetween.

As such, the groups of first and second battery cells B1 and B2 may be respectively arranged on opposite sides of the circuit board C and may have substantially the same arrangement structure or similar arrangement structures and may have substantially the same electrical connection structure or similar electrical connection structures. Hereinafter, a battery cell B may refer to any one of the first and second battery cells B1 and B2 or may also refer to all of the first and second battery cells B1 and B2 in a generic sense. For reference, throughout the present specification, the first axis Z1 may indicate a forward and backward direction along which the circuit board C extends and may indicate a row direction in which a group of battery cells B are aligned on one line. As described below, a second axis Z2 may indicate a direction crossing (or intersecting) the first axis Z1, and battery cells B in rows adjacent to each other in the second axis Z2 may correspond to battery cells B in a preceding row and battery cells B in a following row. In one embodiment of the present disclosure, the second axis Z2 may refer to a direction perpendicular to the first axis Z1. As described below, in one embodiment of the present disclosure, the second axis Z2 may indicate a direction in which a first connection tab T1 (see, e.g., FIG. 2) protrudes from the first surface C1 of the circuit board C and/or may indicate a direction in which a second connection tab T2 (see, e.g., FIG. 2) protrudes from the second surface C2 of the circuit board C.

In one embodiment of the present disclosure, a cell holder 110 may include first and second edge portions S1 and S2 (see, e.g., FIG. 2) extending in the first axis Z1 in which rows of battery cells B are arranged. For example, the second axis Z2 may be defined as a direction from the first edge S1 to the second edge S2 of the cell holder 110, and in such an embodiment, a preceding row of battery cells B in the second axis Z2 may indicate a row relatively closer to the first edge S1 of the cell holder 110 and a following row of battery cells B in the second axis Z2 may indicate a row relatively closer to the second edge S2 of the cell holder 110. In the present disclosure, the second axis Z2 may include directions opposite to each other (e.g., a positive and negative direction in the second axis Z2), but the technical contents of the present disclosure to be described below may be substantially the same as or similar to each other within a range in which an arrangement relationship between the preceding row and the following row is set according to definition of the second axis Z2.

The battery cells B may be arranged in a plurality of rows parallel to the first axis Z1. In one embodiment of the present disclosure, each of the group of first battery cells B1 and the group of second battery cells B2 may include a total of ten rows of battery cells B arranged in parallel with the first axis Z1. In such an embodiment, the battery cells B in the preceding row and the following row adjacent to each other along the second axis Z2 may be diagonally arranged (e.g., diagonally offset) forward or backward along the first axis Z1, and accordingly, the battery cells B in the preceding row and the following row adjacent to each other may be arranged in a zigzag pattern instead of being arranged in one line along the second axis Z2. In one embodiment of the present disclosure, the battery cells B may be arranged in one line along the first axis Z1 and arranged in a zigzag pattern along the second axis Z2. Throughout the present specification, the battery cells B being arranged in a zigzag pattern along the second axis Z2 may indicate that the battery cells B in the preceding row and the following row adjacent to each other are arranged in a zigzag pattern along the second axis Z2 while being diagonally arranged (e.g., offset) forward or backward along the first axis Z1 without indicating that the battery cells B are aligned on one line along the second axis Z2. An arrangement in the zig-zag pattern may generally indicate extension along the second axis Z2.

According to one embodiment of the present disclosure, when the battery cells B in the preceding row and the following row adjacent to each other are arranged in a zigzag pattern without being aligned on one line along the second axis Z2, the battery cells B may be more densely arranged. As described below, the battery cells B arranged in rows in parallel with the first axis Z1 may form a series connection (e.g., may be connected to each other in series), and the battery cells B arranged in a zigzag pattern along the second axis Z2 may form a parallel connection (e.g., may be connected to each other in parallel). By forming a parallel connection in a zig-zag pattern without forming a parallel connection on one line along the second axis Z2, a compact, high-capacity battery pack may be provided, and the number of rows of the battery cells B forming the battery pack may be reduced. For example, the first and second battery cells B1 and B2 arranged in a zig-zag pattern along the second axis Z2 may respectively form first and second parallel modules PM1 and PM2 (see, e.g., FIG. 2). Electrical connection structures of the first and second parallel modules PM1 and PM2 (see, e.g., FIG. 2) may be substantially the same as or similar to each other, and hereinafter, a parallel module PM may refer to any one of the first and second parallel modules PM1 and PM2 or may refer to all of the first and second parallel modules PM1 and PM2 in a generic sense.

In one embodiment of the present disclosure, when the battery cells B in the preceding row and the following row adjacent to each other along the second axis Z2 are diagonally arranged forward and backward, the battery cells B in the following row may be arranged to be fitted into valley regions of the battery cells B in the preceding row such that dead spaces caused by the valley regions may be avoided, and thus, a compact battery pack in which multiple battery cells B are more densely arranged within a limited region may be provided.

Referring to FIGS. 2 and 3, in one embodiment of the present disclosure, multiple battery cells B arranged in a zigzag pattern along the second axis Z2 may form a parallel module PM while being connected in parallel to each other, and parallel modules PM adjacent to each other along the first axis Z1 may be connected in series to each other. In other words, in one embodiment of the present disclosure, multiple parallel modules PM may be arranged along the first axis Z1, and the multiple parallel modules PM arranged along the first axis Z1 may be connected to each other in series along the first axis Z1. Accordingly, in one embodiment of the present disclosure, the first axis Z1 may correspond to a series connection direction, and the second axis Z2 may correspond to a parallel connection direction. Here, because multiple battery cells B arranged in a zigzag pattern along the second axis Z2 form the parallel modules PM, a parallel connection is formed along the second axis Z2 or is formed approximately along the second axis Z2.

The first and second battery cells B1 and B2 may be electrically connected to each other through first and second bus bars 150a and 150b. The first bus bar 150a may connect first battery cells B1 belonging to the same parallel module PM in parallel and connect (e.g., simultaneously connect) first battery cells B1 belonging to adjacent parallel modules PM in series. For example, the first bus bar 150a may connect in parallel the first battery cells B1 belonging to the same parallel module PM in a parallel connection direction that generally follows the second axis Z2 and may connect in series the first battery cells B1 belonging to the parallel modules PM adjacent to each other in a series connection direction corresponding to the first axis Z1. Similarly, the second bus bar 150b may connect in parallel the second battery cells B2 belonging to the same parallel module PM and may connect (e.g., simultaneously connect) in series the second battery cells B2 belonging to the adjacent parallel modules PM. Series/parallel connection structures of the first and second battery cells B1 and B2 made by the first and second bus bars 150a and 150b are substantially the same as or similar to each other, and hereinafter, a bus bar 150 may refer to any one of the first and second bus bars 150a and 150b or may refer to all of the first and second bus bars 150a and 150b in a generic sense.

Referring to FIGS. 3 and 4, in one embodiment of the present disclosure, multiple battery cells B arranged in a zigzag pattern along the second axis Z2 may be connected in parallel, and the multiple battery cells B arranged in a zigzag pattern along the second axis Z2 may be connected in parallel to each other to form the parallel module PM. In one embodiment of the present disclosure, the parallel module PM may include first and second parallel connections CN1 and CN2 that connect in parallel the battery cells B in a preceding row and a following row adjacent to each other along the second axis Z2 and a third parallel connection CN3 that connects in parallel the battery cells B in the same row. The first parallel connection CN1 may connect the battery cells B in a front position (e.g., a front position of the parallel module PM) to the battery cell B in a rear position (e.g., a rear position of the parallel module PM) while connecting the battery cell B in a preceding row to the battery cell B in a following row. The second parallel connection CN2 may connect the battery cell B in a rear position to the battery cell B in a front position while connecting the battery cell B in a preceding row to a battery cell B in a following row. The first and second parallel connections CN1 and CN2 may connect the battery cells B in the preceding row and the following row and may form parallel connections respectively in a direction from a front position toward a rear position and in a direction from the rear position toward the front position. For example, the first and second parallel connections CN1 and CN2 may respectively connect the battery cell B in a preceding row to the battery cell B in a following row in a diagonal direction at an acute angle clockwise and counterclockwise with respect to the second axis Z2.

Unlike the first and second parallel connections CN1 and CN2, the third parallel connection CN3 does not connect the battery cell B in the preceding row to the battery cell B in the following row and may connect the battery cells B that are arranged in parallel along the first axis Z1 (e.g., may connect battery cells B that are in the same row). In one embodiment of the present disclosure, the battery cells B arranged in a zigzag pattern along the second axis Z2 may form the parallel modules PM connected to each other in parallel, and the parallel modules PM may include the first and second parallel connections CN1 and CN2 that connect the battery cells B in the preceding rows and the following rows along the second axis Z2 and the third parallel connection CN3 that connects the battery cells B in the same row, and thus, the number of battery cells B that form a parallel connection of each of the parallel modules PM may be increased without increasing a size of a battery pack along the second axis Z2. Accordingly, a compact, high-capacity battery pack may be provided.

In one embodiment of the present disclosure, each of the parallel modules PM may include thirteen battery cells B connected to each other in parallel. Ten of the thirteen battery cells B forming each of the parallel modules PM may be arranged in a zig-zag pattern together with other adjacent battery cells B along the second axis Z2, and three of the thirteen battery cells B are arranged in parallel together with the adjacent battery cells B along the first axis Z1 through the third parallel connection CN3. Thus, a length of the parallel module PM along the second axis Z2 may be reduced, and accordingly, a width of a battery pack along the second axis Z2 may be reduced. For example, in one embodiment of the present disclosure, while limiting the width of the battery pack along the second axis Z2 to a size corresponding to the ten battery cells B, the thirteen battery cells B are connected in parallel in each of the parallel modules PM, and thus, a high-capacity output may be provided in a compact space.

Referring to FIGS. 4 to 6B, in one embodiment of the present disclosure, the parallel modules PM may each include the third parallel connection CN3 that connects the battery cells B (e.g., a front cell FB and a rear cell RB) in the same row (e.g., a row PR) to each other. For example, the parallel modules PM may include three third parallel connections CN3. For example, the parallel modules PM may include three rows PR that form the third parallel connection CN3. In addition, in each of the three rows PR, the front cell FB may be connected in parallel to the rear cell RB through the third parallel connection CN3.

The front cell FB may be connected to the rear cell RB through the third parallel connection CN3 and also form the second parallel connection CN2 with a preceding row (see, e.g., FIG. 5B), or may be connected to the rear cell RB through the third parallel connection CN3 and also form the first parallel connection CN1 with a following row (see, e.g., FIG. 5A). For example, in a row other than the row PR, each of the battery cells B may be connected to a preceding row and a following row while forming the first and second parallel connections CN1 and CN2, and likewise, the front cell FB that forms the third parallel connection CN3 may form the first parallel connection CN1 (see, e.g., FIG. 5A) or the second parallel connection CN2 (see, e.g., FIG. 5B) in addition to the third parallel connection CN3. In such an embodiment, according to a position of the front cell FB, the corresponding front cell FB may further form the first parallel connection CN1 (see, e.g., FIG. 5A) or the second parallel connection CN2 (see, e.g., FIG. 5B) in addition to the third parallel connection CN3. For example, the front cell FB may form the first and third parallel connections CN1 and CN3, or may form the second and third parallel connections CN2 and CN3.

Similarly, the rear cell RB may be connected to the front cell FB through the third parallel connection CN3 and may also form the first parallel connection CN1 with the preceding row (see, e.g., FIG. 5A), or may be connected to the front cell FB through the third parallel connection CN3 and may also form the second parallel connection CN2 with the following row (see, e.g., FIG. 5B). For example, the rear cell RB may form both the first and third parallel connections CN1 and CN3 (see, e.g., FIG. 5A) or may form both the second and third parallel connections CN2 and CN3 (see, e.g., FIG. 5B).

In summary, in the battery pack according to an embodiment of the present disclosure, each of the battery cells B may form the first and second parallel connections CN1 and CN2, the first and third parallel connections CN1 and CN3, or the second and third parallel connections CN2 and CN3. However, in one embodiment of the present disclosure, each of the battery cells B may also form only the first parallel connection CN1 or only the second parallel connection CN2. For example, in one embodiment of the present disclosure, a first position correction cell CB1 may form only the first parallel connection CN1 with both the preceding row and the following row and may not form the second parallel connection CN2. For example, the first position correction cell CB1 (see, e.g., FIG. 6A) may form (e.g., may form only) two first parallel connections CN1 instead of forming both the first and second parallel connections CN1 and CN2. Similarly, a second position correction cell CB2 (see, e.g., FIG. 6B) may form only two second parallel connections CN2 instead of forming both the first and second parallel connections CN1 and CN2.

The first and second position correction cells CB1 and CB2 may form only the first parallel connection CN1 or only the second parallel connection CN2, thereby roughly matching central positions (e.g., central positions between three rows PR) of different rows PR in the same parallel module PM. When the center positions of different rows PR in the same parallel module PM are deviated (e.g., greatly deviated or offset) from each other along the first axis Z1, a connection length between the different rows PR may be increased, the parallel connection may be deflected toward a front position or a rear position along the first axis Z1, the deflection of the parallel connection may be cumulated along the first axis Z1, and thus, a width of the entire battery pack may be increased along the first axis Z1.

Accordingly, in one embodiment of the present disclosure, central positions (e.g., central positions of three rows PR) of the different rows PR in the same parallel module PM may approximately match each other through the first and second position correction cells CB1 and CB2, and a positional deviation along the first axis Z1 may be avoided. For example, the first and second position correction cells CB1 and CB2 may form only the first parallel connection CN1 or only the second parallel connection CN2 to form parallel connection directions to be deflected toward a front position or a rear position and, through this, may approximately match central positions (e.g., center position of three rows PR) of different rows PR belonging to the same parallel module PM. In one embodiment of the present disclosure, the first and second position correction cells CB1 and CB2 may be arranged between the rows PR belonging to the same parallel module PM, and the first and second position correction cells CB1 and CB2 may each be between the preceding row PR and the following row PR, and thus, a positional deviation between the rows PR may be avoided.

Referring to FIG. 4, the row PR may be formed at different row positions in adjacent parallel modules PM. Here, the specific rows PR that are formed at different row positions in the parallel modules PM adjacent to each other may indicate that, when the rows PR of an A parallel module A are formed in the fifth, seventh, and ninth rows, the rows PR of a B parallel module B may be formed in the second, fourth, and tenth rows so as not to overlap with the rows PR of the A parallel module A. When the rows PR are formed in the same row position in the parallel modules PM adjacent to each other, a parallel connection may be deflected such that the rows PR overlap each other and are deflected toward a front position or a rear position, and in a row position where the rows PR overlap each other, the deflection of the parallel connection towards the front position or the rear position is accumulated along the first axis Z1 to cause a length of the parallel connection to be increased or a size of a battery pack to be increased along the first axis Z1.

A battery pack may include battery units U repeatedly arranged such that adjacent parallel modules PM include the rows PR at different row positions, and a configuration may be easily implemented in which the battery units U are repeatedly arranged and the adjacent parallel modules PM include rows PR at different row positions. For example, the battery units U may each include multiple parallel modules PM, and the parallel modules PM adjacent to each other from among the multiple parallel modules PM may include the rows PR formed at different row positions (e.g., formed in different rows).

In one embodiment of the present disclosure, the battery units U may each include six parallel modules A, B, C, D, E, and F. For example, the battery unit U may each include A to F parallel modules A, B, C, D, E, and F, the A parallel module A may include the rows PR formed in the fifth, seventh, and ninth rows, the B parallel module B may include the rows PR formed in the second, fourth, and tenth rows, and the C parallel module C may include the rows PR formed in the first, sixth, and eighth rows. In addition, the D parallel module D may include the rows PR formed in the third, fifth, and seventh rows, the E parallel module E may include the rows PR formed in the second, ninth, and tenth rows, and the F parallel module F may include the rows PR formed in the fourth, sixth, and eighth rows. As such, the A to F parallel modules A, B, C, D, E, and F may each include three rows PR, and the positions of the three rows PR in each of the parallel modules A, B, C, D, E, and F may be mutually exclusive. For example, when positions of the rows PR formed in the A to F parallel modules A, B, C, D, E, and F are comprehensively considered, the rows PR may overlap each other in any one row position, but the rows PR may not overlap each other in more than one row position (e.g., may not overlap each other in two or three row positions). In addition, the parallel modules PM in which the rows PR overlap each other in any one row position may not be adjacent to each other.

In the battery pack according to an embodiment of the present disclosure, the battery units U may be repeatedly arranged along the first axis Z1. Here, a blank (or empty) position V in which there is no battery cell B may be formed in a boundary region between the first battery unit U1 and the second battery unit U2 along the first axis Z1. The blank position V may facilitate formation of the battery pack by simplifying a configuration of the repeatedly arranged battery units U. For example, in one embodiment of the present disclosure, the battery units U may each include six parallel modules PM, and the battery pack may be formed by repeatedly arranging the battery units U that each include the six parallel modules PM. When the blank position V is not formed in the boundary region between the adjacent first and second battery units U1 and U2, the number of parallel modules PM that form the first and second battery units U1 and U2 may need to be significantly increased, which may not meet the purpose of simplifying a configuration of the battery pack and facilitating implementation of the battery pack through repeated arrangement of the battery units U. In one embodiment of the present disclosure, structures of the battery units U may be simplified through the blank position V, and by repeatedly arranging the battery units U having a simplified structure, the battery pack may be easily implemented.

The blank position V may be a position where the battery cell B is not filled (e.g., may be a position where a battery cell B is not present) from among other battery cells B arranged in a row along the first axis Z1. For example, in one embodiment of the present disclosure, the battery cells B may be arranged in rows at approximately constant intervals along the first axis Z1, and the blank position V may be a blank space in which the battery cell B is not filled. In one embodiment of the present disclosure, the blank position V is in a boundary region between the first and second battery units U1 and U2 adjacent to each other along the first axis Z1, and when the first and second battery units U1 and U2 are adjacent to each other, the boundary region may be a region of the first battery unit U1 that is adjacent to the second battery unit U2 or may be a region of the second battery unit U2 that is adjacent to the first battery unit U1.

Referring to FIG. 7, in one embodiment of the present disclosure, an electrical connection of the battery cell B may be made by a bus bar 150 on an upper end portion 10a of the battery cell B, and electrodes 11 and 12 formed on the upper end portion 10a of the battery cell B may be electrically connected to each other through the bus bar 150. In one embodiment of the present disclosure, the electrical connection of the battery cell B may be made through the upper end portion 10a of the battery cell B, and cooling of the battery cell B rather than the electrical connection may be made through a lower end portion 10b of the battery cell B.

The bus bar 150 may avoid the upper end portion 10a of the battery cell B and may extend along the first and second axes Z1 and Z2 to expose the electrodes 11 and 12 formed on the upper end portion 10a of the battery cell B. In some embodiments, the bus bar 150 may include first portions 151 extending along the first axis Z1 and second portions 152 extending along the second axis Z2. Here, the second portions 152 may extend along the second axis Z2 and may extend across the adjacent parallel modules PM, and the first portions 151 may extend along the first axis Z1 and connect the second portions 152 to each other or may extend along the first axis Z1 for the third parallel connection CN3. As such, the bus bar 150 may include the first and second portions 151 and 152 extending along the first and second axes Z1 and Z2 but may generally extend along the second axis Z2 across the adjacent parallel modules PM.

The bus bar 150 may include the first and second bus bars 150a and 150b (see, e.g., FIG. 3) extending generally along the second axis Z2 from the first and second surfaces C1 and C2 side of the circuit board C to form the parallel modules PM1 and PM2 (see, e.g., FIG. 2) by connecting the first and second battery cells B1 and B2 arranged on the first and second surfaces C1 and C2 side of the circuit board C. In such an embodiment, the first and second parallel modules PM1 and PM2 formed by the first and second bus bars 150a and 150b extending generally along the second axis Z2 from the first and second surfaces C1 and C2 of the circuit board C may also be arranged along the second axis Z2 from the first and second surfaces C1 and C2 side of the circuit board C.

Referring to FIG. 7, in one embodiment of the present disclosure, multiple battery cells B from the same parallel module PM may form the parallel modules PM while the electrodes 11 and 12 are connected together to the bus bar 150. In addition, the different battery cells B belonging to the parallel modules PM adjacent to each other along the first axis Z1 may be connected to each other in series while different electrodes 11 and 12 thereof are connected to the bus bar 150 together. As described below, a connection member W is between the electrodes 11 and 12 of the battery cells B and the bus bar 150 to make an electrical connection therebetween, and the connection member W may form a parallel connection by connecting the same polarities of the different battery cells B to the same bus bar 150, and the connection member W may form a series connection by connecting different polarities of the different battery cells B to the same bus bar 150.

Referring to FIG. 8, the battery cell B may extend along a third axis Z3 and may be provided as a circular (e.g., cylindrical) battery cell B. For example, the battery cell B may have a circular upper end portion 10a and a circular lower end portion 10b respectively formed at upper and lower ends along the third axis Z3 and may have a rounded outer circumferential surface between the upper end portion 10a and the lower end 10b as a side surface 10c. In one embodiment of the present disclosure, the battery cell B may include the second electrode 12 formed at a central position of the upper end portion 10a and the first electrode 11 formed over the lower end portion 10b and extending along the side surface 10c to a border of the upper end portion 10a. In such an embodiment, both the second electrode 12 at the central position and the first electrode 11 at the border of the upper end portion 10a may be formed on the upper end portion 10a of the battery cell B, and a parallel connection may be made by connecting the first electrodes 11 or the second electrodes 12 formed on the upper end portion 10a of the battery cell B to the same bus bar 150 through the connection member W that connects the upper end portion 10a of the battery cell B to the bus bar 150 or a series connection may be made by connecting the first and second electrodes 11 and 12 formed on the upper end portion 10a of the battery cell B to the same bus bar 150.

Referring to FIGS. 2 and 7, the electrical connection between the bus bar 150 and the battery cell B may be made by the connection member W having one end portion connected to the bus bar 150 and the other end portion connected to the electrodes 11 and 12 of the battery cell B. The connection member W may be formed of a conductive wire in the form of a thin metal wire or a conductive ribbon in the form of a metal strip and may connect the battery cell B and the bus bar 150 through wire bonding or ribbon bonding. In one embodiment of the present disclosure, the connection member W may be formed of a conductive wire, and hereinafter, the connection member W formed of a conductive wire will be primarily described.

The connection member W may be bonded to the electrodes 11 and 12 of the battery cell B through wire bonding and may electrically connect the bus bar 150 bonded to one end portion of the connection member W to the battery cell B bonded to the other end portion of the connection member W in a suspended state between the one end portion and the other end portion.

The group of first battery cells B1 may form multiple first parallel modules PM1 (see, e.g., FIG. 2) arranged along the first axis Z1, and the multiple first parallel modules PM1 (see, e.g., FIG. 2) may form a series connection along the first axis Z1. Similarly, the group of second battery cells B2 may form multiple second parallel modules PM2 (see, e.g., FIG. 2) arranged along the first axis Z1, and the multiple second parallel modules PM2 may form a series connection along the first axis Z1. The first and second parallel modules PM1 and PM2 (see, e.g., FIG. 2) may be respectively arranged on first and second surface C1 and C2 sides of the circuit board C and may be connected in series to the first and second surface C1 and C2 sides of the circuit board C. In one embodiment of the present disclosure, the multiple first parallel modules PM1 (see, e.g., FIG. 2) may be connected in series from a front position to a rear position along the first axis Z1, and the multiple second parallel modules PM2 (see, e.g., FIG. 2) may be connected in series from the rear position to the front position along the first axis Z1. In addition, the first parallel module PM1 at the rearmost position along the first axis Z1 and the second parallel module PM2 at the rearmost position along the first axis Z1 are electrically connected to each other through a third bus bar 150c (see, e.g., FIG. 1), and thus, the first and second parallel modules PM1 and PM2 (see, e.g., FIG. 2) may be connected in series to each other through the third bus bar 150c (see, e.g., FIG. 1). For example, an electrical connection direction (e.g., a series connection direction) of the battery pack may be formed from a front position to a rear position along the multiple first parallel modules PM1 arranged along the first axis Z1 and, then, may be formed from the rear position to the front position along the multiple second parallel modules PM2 arranged along the first axis Z1 while making a U-turn via the third bus bar 150c (see, e.g., FIG. 1) in the rearmost position.

In some embodiments, the first parallel module PM1 arranged at the rearmost along the first axis Z1 and the second parallel module PM2 arranged at the rearmost along the first axis Z1 may be connected in series to each other by the third bus bar 150c (see, e.g., FIG. 1) that connects the first and second bus bars 150a and 150b, respectively forming the first and second parallel modules PM1 and PM2 (see, e.g., FIG. 2) in the rearmost position. Accordingly, in the battery pack according to an embodiment of the present disclosure, the series connection direction may extend from the front position to the rear position along the first axis Z1 in the group of first battery cells B1 and, then, may extend from the rear position to the front position along the first axis Z1 in the group of second battery cells B2 by making a U-turn in the rearmost position.

Figure 9:
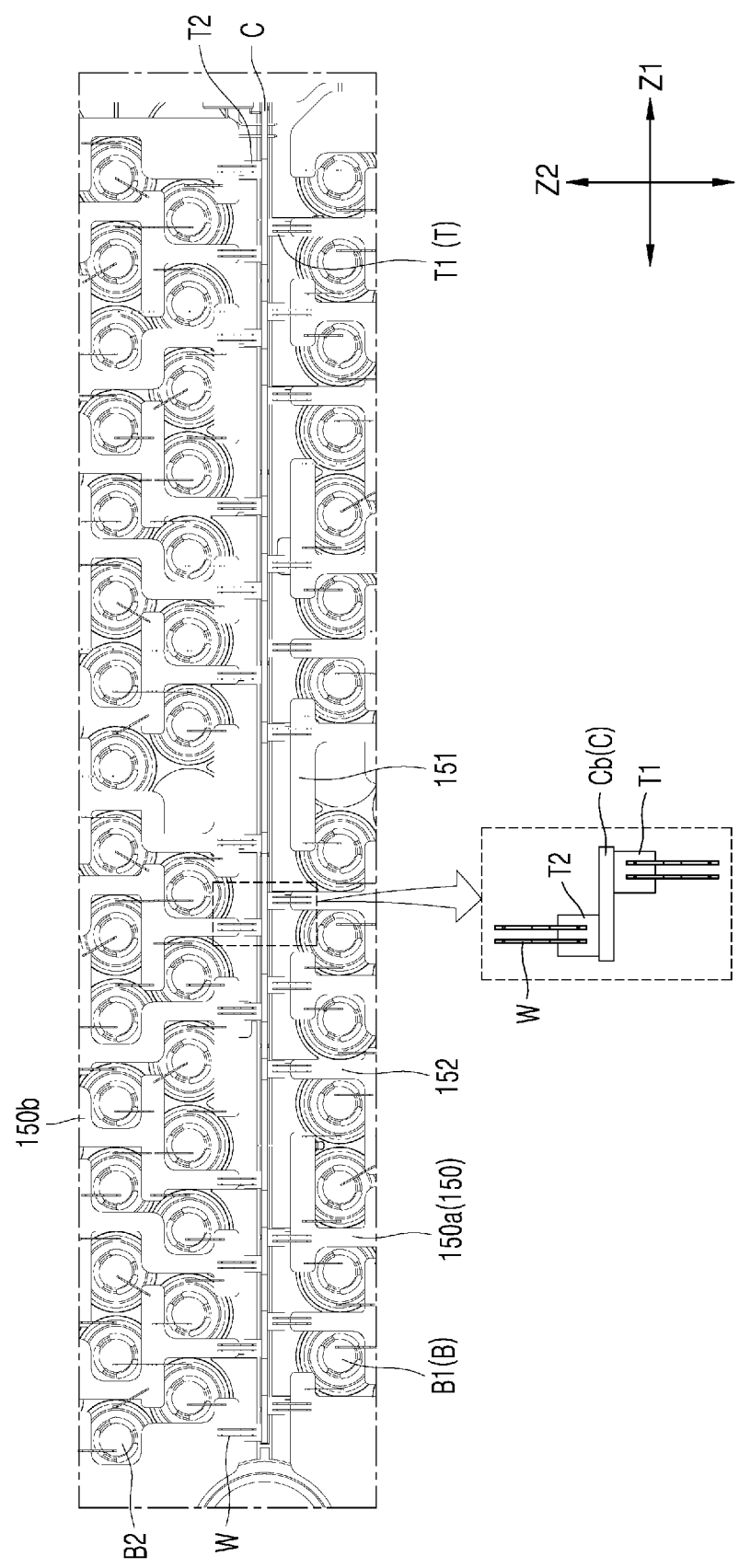
FIG. 9 is a view illustrating a connection of a circuit board shown in FIG. 3.
Figure 10:
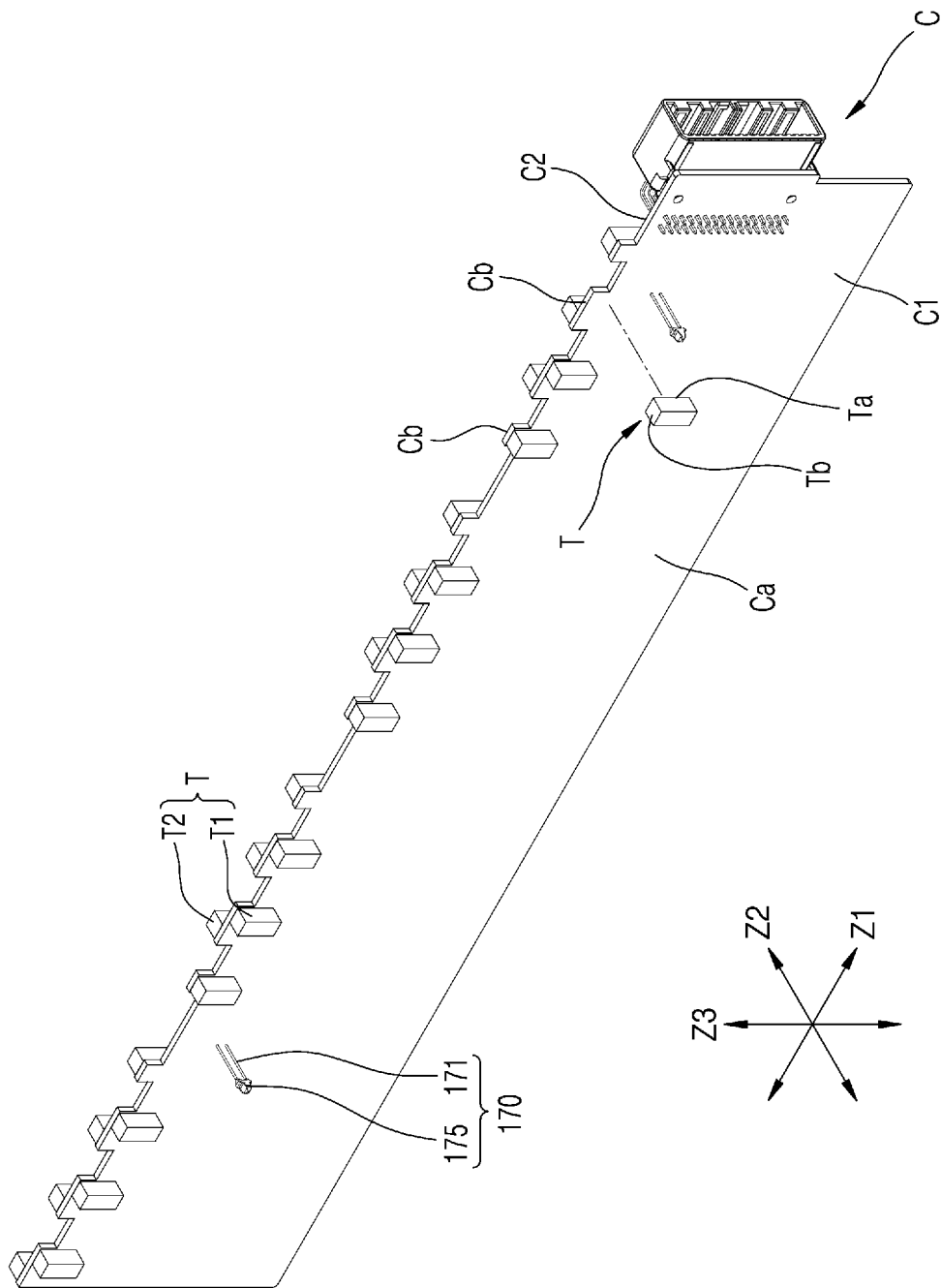
FIG. 10 is a perspective view of a circuit board shown in FIG. 9.

FIG. 9 is a view illustrating a connection of a circuit board shown in FIG. 3, and FIG. 10 is a perspective view of the circuit board illustrated shown in FIG. 9.

Referring to, for example, FIGS. 1 and 2, the circuit board C may be between the group of first battery cells B1 and the group of second battery cells B2. The circuit board C may be between the first and second battery cells B1 and B2 to collect state information from the first and second battery cells B1 and B2 arranged on both sides (e.g., on opposite sides) of the circuit board C and provide data for controlling charging and discharging operations of the first and second battery cells B1 and B2 by generating the state information collected from the first and second battery cells B1 and B2. In one embodiment of the present disclosure, the state information of the first and second battery cells B1 and B2 may include voltage information, temperature information, and current information of the first and second battery cells B1 and B2. As described below, in one embodiment of the present disclosure, the circuit board C may obtain the voltage information from the first and second battery cells B1 and B2 arranged on the first and second surface C1 and C2 sides of the circuit board C and may obtain the temperature information from the second battery cell B2 on one side of the circuit board C.

Referring to FIGS. 9 and 10, the circuit board C may include a base portion Ca and tab mounting portions Cb protruding upwardly from the base portion Ca along the third axis Z3. First and second connection tabs T1 and T2 respectively arranged toward the first and second battery cells B1 and B2 may be mounted on the tab mounting portions Cb to be electrically connected to the first and second battery cells B1 and B2. For example, the first and second connection tabs T1 and T2 may be respectively mounted on the first and second surfaces C1 and C2 of the tab mounting portion Cb, with the first and second surfaces C1 and C2 being opposite to each other. The tab mounting portion Cb may be formed at an intermittent position along the first axis Z1 and may include different tab mounting portions Cb formed to have different lengths along the first axis Z1. For example, the tab mounting portion Cb may include a tab mounting portion Cb extending in a relatively long length such that the first and second connection tabs T1 and T2 are mounted thereon and a tab mounting portion Cb extending in a relatively short length such that any one connection tab T from among the first and second connection tabs T1 and T2 is mounted thereto. As described below, the tab mounting portion Cb may be exposed on an upper holder 110a by penetrating (or extending) through a sensing hole (e.g., a sensing opening) 110s (see, e.g., FIG. 13) in the upper holder 110a. The first and second connection tabs T1 and T2 mounted on the tab mounting portion Cb may also be exposed on the upper holder 110a, and the first and second connection tabs T1 and T2 exposed on the upper holder 110a may be respectively and electrically connected to the first and second bus bars 150a and 150b, which are respectively connected to the first and second battery cells B1 and B2. Hereinafter, the first and second connection tabs T1 and T2 formed on the first and second surfaces C1 and C2 of the circuit board C may indicate that the first and second connection tabs T1 and T2 are formed on the first and second surfaces C1 and C2 of the second of the tab mounting portion Cb of the circuit board C.

The connection tabs T protruding toward the first and second battery cells B1 and B2 may be formed on the circuit board C (e.g., on the tab mounting portion Cb of the circuit board C). For example, the connection tab T may include the first and second connection tabs T1 and T2 respectively protruding toward the first and second battery cells B1 and B2. For example, the circuit board C may have the first and second surfaces C1 and C2 opposite to each other, and the first connection tab T1 protruding toward the first battery cell B1 may be formed on the first surface C1 of the circuit board C and the second connection tab T2 protruding toward the second battery cell B2 may be formed on the second surface C2 of the circuit board C. The first and second connection tabs T1 and T2 may be formed in the tab mounting portion Cb of the circuit board C protruding upwardly along the third axis Z3 and may be formed at approximately the same height as the first and second bus bars 150a and 150b arranged on the first and second battery cells B1 and B2. Here, the third axis Z3 may indicate a direction crossing (e.g., intersecting) the first and second axes Z1 and Z2, for example, a direction perpendicular to the first and second axes Z1 and Z2 and may indicate a longitudinal direction in which the first and second battery cells B1 and B2 extend.

The first and second connection tabs T1 and T2 may be electrically connected to the circuit board C, and thus, voltage information of the first and second battery cells B1 and B2 may be transmitted from the first and second connection tabs T1 and T2 to the circuit board C. The first and second connection tabs T1 and T2 may have a fixing surface Ta coupled on the first and second surfaces C1 and C2 of the circuit board C, and a coupling surface Tb that extends from the fixing surface Ta and forms an uppermost surface along the third axis Z3. The fixing surfaces Ta of the first and second connection tabs T1 and T2 may be fixed on the first and second surfaces C1 and C2 of the circuit board C by, for example, soldering, and a detection connection member W (see, e.g., FIG. 9) may be bonded to the coupling surfaces Tb of the first and second connection tabs T1 and T2. In one embodiment of the present disclosure, the first and second connection tabs T1 and T2 may each be formed of a rectangular metal block having the fixing surface Ta and the coupling surface Tb in contact with each other at one corner and may be formed of a rectangular metal block having the third axis Z3 as a long axis. For example, the first and second connection tabs T1 and T2 may be formed of a rectangular nickel block. In another embodiment of the present disclosure, the first and second connection tabs T1 and T2 may each be formed of a metal thin plate having a bent structure, for example, a nickel plate having a bent structure. In such an embodiment, the first and second connection tabs T1 and T2 may each include the fixing surface Ta coupled on the first and second surfaces C1 and C2 of the circuit board C and the coupling surface Tb that is bent from the fixing surface Ta and extends toward the first and second battery cells B1 and B2.

Referring to FIG. 9, the first and second connection tabs T1 and T2 of the circuit board C may be respectively and electrically connected to the first and second bus bars 150a and 150b that respectively form the first and second parallel modules PM1 and PM2 (see, e.g., FIG. 2). For example, the detection connection members W for making electrical connections may be between the first and second connection tabs T1 and T2 and the first and second bus bars 150a and 150b. The detection connection members W may each include one end portion bonded to one of the first and second connection tabs T1 and T2 and another end portion bonded to one of the first and second bus bars 150a and 150b and may extend in a suspended state between the one end portion and the other end portion bonded to one of the first and second connection tabs T1 and T2 and one of the first and second bus bars 150a and 150b through wire bonding. For example, the detection connection member W may be bonded to one end of each of the first and second bus bars 150a and 150b extending along the second axis Z2 and may be bonded to the first portion 151 or the second portion 152 that forms one end of each of the first and second bus bars 150a and 150b. For example, the detection connection member W may be bonded to the first portion 151 extending along the first axis Z1 or the second portion 152 extending along the second axis Z2 from among the first and second bus bars 150a and 150b. In one embodiment of the present disclosure, when one end of each of the first and second bus bars 150a and 150b is formed of the first portion 151, formation positions of the first and second connection tabs T1 and T2 arranged along the first axis Z1 may be limited by the first portion 151 extending along the first axis Z1, and accordingly, the tab mounting portion Cb in which only one connection tab T of the second connection tabs T1 and T2 is formed may be arranged at a position overlapping the first portion 151. For example, the first and second connection tabs T1 and T2 may be mounted together on the tab mounting portion Cb of the circuit board C, and when one end of at least one bus bar 150 from among the first and second bus bars 150a and 150b is formed of the first portion 151, the tab mounting portion Cb on which only one connection tab T from among the first and second connection tabs T1 and T2 is mounted may be arranged at a position overlapping the first portion 151.

In one embodiment of the present disclosure, by detecting voltages of the first and second bus bars 150a and 150b, voltages of the first and second battery cells B1 and B2 connected in parallel to each other through the first and second bus bars 150a and 150b may be measured. In one embodiment of the present disclosure, the detection connection members W may be formed in parallel between the first and second bus bars 150a and 150b and the first and second connection tabs T1 and T2, and electrical connections between the first and second bus bars 150a and 150b and the first and second connection tabs T1 and T2 may be maintained through two or more detection connection members W connected in parallel therebetween in the event of disconnection of any one of the detection connection members W.

Multiple first and second connection tabs T1 and T2 may be formed along the first axis Z1 along which the circuit board C extends, and voltage information of the first and second battery cells B1 and B2 arranged on both sides of the circuit board C may be obtained through the first and second connection tabs T1 and T2 arranged along the first axis Z1. The first and second connection tabs T1 and T2 may be formed at different locations of the circuit board C along the first axis Z1 and may be formed at different locations away from each other. For example, the first connection tab T1 may include multiple first connection tabs T1 formed at locations spaced apart from each other along the circuit board C to be electrically connected to different first bus bars 150a arranged along the first axis Z1, and voltages of different first parallel modules PM1 (see, e.g., FIG. 2) arranged along the first axis Z1 may be measured through the multiple first connection tabs T1. Similarly, the second connection tab T2 may include multiple second connection tabs T2 formed at locations spaced apart from each other along the circuit board C to be electrically connected to different second bus bars 150b arranged along the first axis Z1, and voltages of different second parallel modules PM2

(see, e.g., FIG. 2) arranged along the first axis Z1 may be measured through the multiple second connection tabs T2. In this way, the multiple first connection tabs T1 may be formed at locations spaced apart from each other along the circuit board C, and the multiple second connection tabs T2 may be formed at locations spaced apart from each other along the circuit board C. In addition, because the multiple first and second connection tabs T1 and T2 are formed at locations spaced apart from each other along the circuit board C, electrical and physical interference between each other may be reduced.

The circuit board C may be in an upright state between the first and second battery cells B1 and B2. For example, the circuit board C may be in an upright state along the third axis Z3 corresponding to a longitudinal direction of the first and second battery cells B1 and B2. For example, the circuit board C may be in an upright state such that the first and second surfaces C1 and C2 of the circuit board C, which are opposite to each other, respectively face the first and second battery cells B1 and B2. In this way, the circuit board C is in an upright state rather than a lying state between the first and second battery cells B1 and B2, and thus, a space occupied by the circuit board C may be reduced, and electrical connections of the first and second parallel modules PM1 and PM2 (see, e.g., FIG. 2) to the first and second connection tabs T1 and T2 formed on the first and second surfaces C1 and C2 of the circuit board C may be easily made. For example, because the circuit board C is in an upright state, the first and second connection tabs T1 and T2 formed in the tab mounting portion Cb of the circuit board C that protrude upwardly along the third axis Z3 may be formed at substantially the same height as the first and second bus bars 150a and 150b, and electrical connections between the first and second connection tabs T1 and T2 and the first and second bus bars 150a and 150b, which are formed at substantially the same height, may be easily made. For example, wire bonding of the detection connection members W for electrical connection between the first and second connection tabs T1 and T2 and the first and second bus bars 150a and 150b may be easily made, a length of the detection connection member W may be reduced, and a risk of disconnection may be reduced.

In one embodiment of the present disclosure, the first and second bus bars 150a and 150b are on the upper holder 110a, and the first and second connection tabs T1 and T2 are connected to the circuit board C under the upper holder 110a but are formed in the tab mounting portion Cb of the circuit board C exposed on the upper holder 110a by penetrating (extending) through the sensing hole 110s formed in the upper holder 110a. Thus, the first and second connection tabs T1 and T2 may be formed at substantially the same height as the first and second bus bars 150a and 150b.

In one embodiment of the present disclosure, the circuit board C may be between the first and second battery cells B1 and B2, thereby detecting voltage information of the first and second battery cells B1 and B2 on both sides of the circuit board C through the detection connection members W bonded to the first and second connection tabs T1 and T2 connected to the first and second surfaces C1 and C2 of the circuit board C. However, the present disclosure is not limited thereto, and for example, the circuit board C may not be between the first and second battery cells B1 and B2. For example, the circuit board C may be on one side of the battery cells B1 to detect the voltage information of the first battery cells B1 on one side of the circuit board C through the first connection tab T1 connected to the first surface C1 of the circuit board C and the detection connection member W bonded to the first connection tab T1. That is, the battery pack according to various embodiments of the present disclosure may not include the first and second battery cells B1 and B2 on both sides of the circuit board C but may include only the first battery cells B1 on one side of the circuit board C and may not include the second battery cells B2 on the other side of the circuit board C. Also, in such an embodiment, the first connection tab T1 may be connected to the first surface C1 of the circuit board C in a form that protrudes toward the first battery cells B1, and the detection connection member W for an electrical connection between the first connection tab T1 and the first battery cell B1 may be formed. For example, the detection connection member W may have one end portion bonded to the first connection tab T1 and the other end portion bonded to the first bus bar 150a connected to the first battery cell B1, thereby electrically connecting the first connection tab T1 to the first bus bar 150a. In addition, also in this embodiment, the circuit board C may be in an upright state to face the first battery cell B1. In addition, the first battery cell B1 may include the multiple first battery cells B1 arranged along the second axis Z2 in which the first bus bar 150a extends or arranged along the second axis Z2 in which the first connection tab T1 protrudes from the first surface C1 of the circuit board C, and the multiple first battery cells B1 arranged along the second axis Z2 may be connected in parallel to each other through the first bus bar 150a to form the first parallel module PM1 (see, e.g., FIG. 2). The circuit board C may include the multiple first connection tabs T1 along a first axis Z1 and may detect voltages of the first parallel modules PM1 through the first bus bar 150a connected to the first parallel modules PM1 arranged along the first axis Z1 (see, e.g., FIG. 2).

Figure 11:
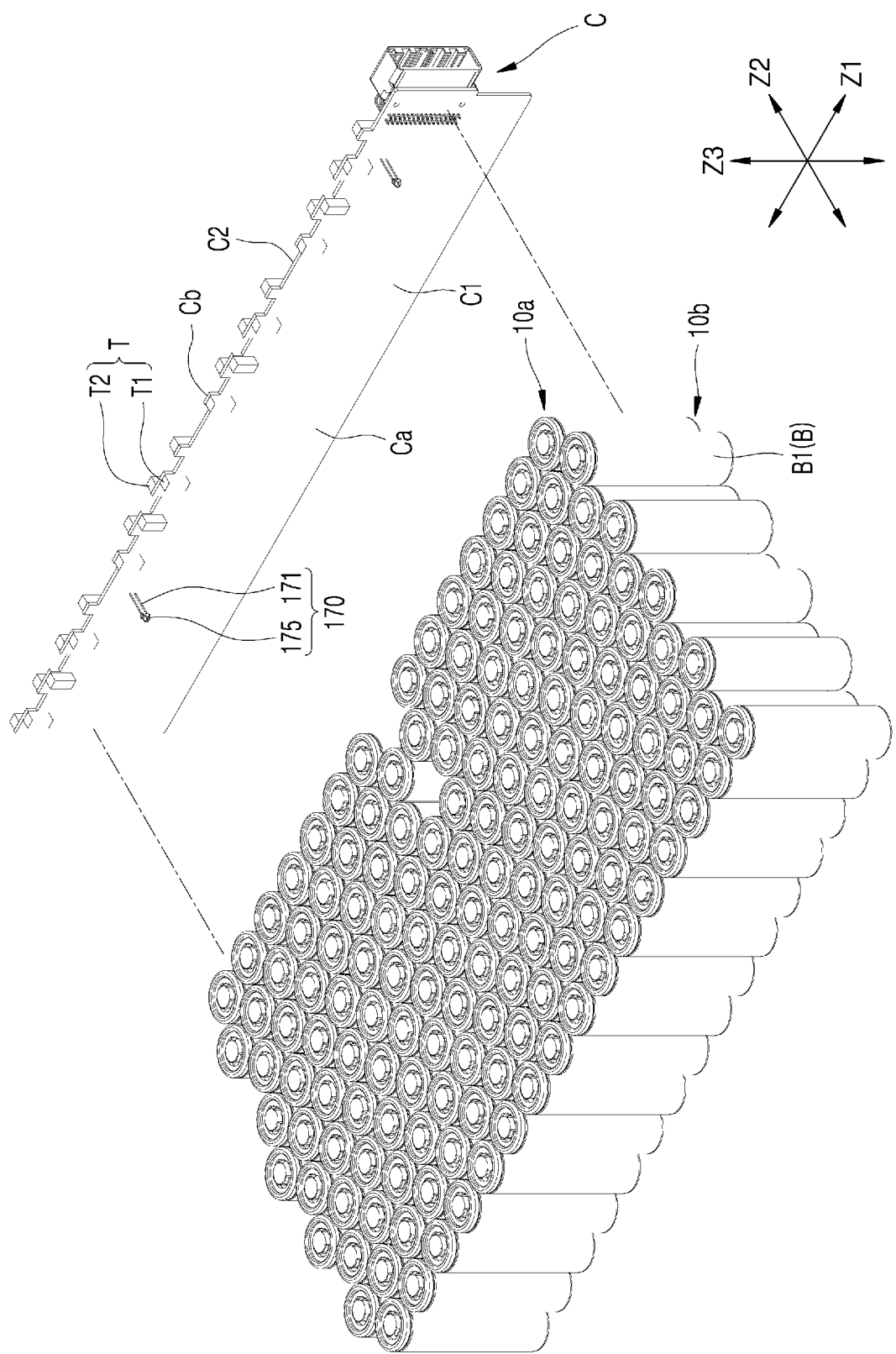
FIG. 11 is a perspective view of a mounting structure of a thermistor for obtaining temperature information of battery cells.

FIG. 11 is a perspective view of a mounting structure of a thermistor 170 for obtaining temperature information of the battery cells B. Referring to FIG. 11, the thermistor 170 may be on the circuit board C. The thermistor 170 may obtain temperature information of the battery cells B and may include, for example, a thermistor chip 175 including a variable resistor of which resistance changes according to a temperature and a thermistor lead 171 connected to the thermistor chip 175. One end portion of the thermistor lead 171 may be connected to the circuit board C, and the thermistor chip 175 connected to the other end portion of the thermistor lead 171 through the thermistor lead 171 extending from one end portion connected to the circuit board C toward the first battery cell B1 or the second battery cell B2 may be in contact with (or at least close to) the first battery cell B1 or the second battery cell B2 to obtain temperature information thereof.

In one embodiment of the present disclosure, the thermistor 170 may obtain temperature information of any group of battery cells B from among the group of the first battery cells B1 and the group of the second battery cells B2 arranged on both sides of the circuit board C. In one embodiment of the present disclosure, the thermistor 170 may not obtain temperature information from both the group of first battery cells B1 and the group of second battery cells B2 facing each other with the circuit board C therebetween and may estimate a temperature distribution of the entire battery pack even when temperature information of only one group of battery cells B is obtained from among the group of first battery cells B1 and the group of second battery cells B2 by achieving a thermal balance (or substantial thermal balance) through a narrow space in which the circuit board C is accommodated.

In one embodiment of the present disclosure, the thermistor 170 may selectively obtain temperature information of the group of first battery cells B1 from among the group of first battery cells B1 and the group of second battery cells B2. Here, the thermistor 170 obtaining temperature information of the group of first battery cells B1 does not indicate that the thermistor 170 obtains temperatures of all the first battery cells B1 and may indicate that the thermistor 170 selectively obtains a temperature of one of the group of first battery cells B1 or temperatures of two or more of the group of first battery cells B1 in a generic sense. In one embodiment of the present disclosure, the thermistor 170 may obtain temperature information of two first battery cells B1 arranged at different positions along the first axis Z1 from among the group of first battery cells B1. For example, the two first battery cells B1 of which temperatures are to be measured may be two first battery cells B1 arranged at different positions along the first axis Z1 while facing the circuit board C directly (e.g., that are directly adjacent to the circuit board C). For example, the first battery cells B1, which are targets of temperature measurement, are close to the circuit board C such that the thermistor 170 fixed to the circuit board C may easily access the first battery cells B1. The first battery cells B1 arranged at an internal position of the battery pack where the circuit board C is arranged are not easily exposed to the external atmosphere having a low temperature, and thus, temperature information of the first battery cells B1 may be obtained at the inner position where a temperature may increase (or may be increased or relatively higher than other first battery cells B1), thereby quickly capturing a possibility of deterioration due to overheating.

In one embodiment of the present disclosure, by obtaining temperature information of the first battery cell B1 through the thermistor 170 connected to the circuit board C between the first and second battery cells B1 and B2, temperature information of the first and second battery cells B1 and B2 that are in a thermal balance through a narrow space in which the circuit board C is accommodated to a certain extent may be measured and estimated without obtaining temperature information of the second battery cell B2 facing the first battery cell B1, which is a target of temperature measurement, with the circuit board C interposed therebetween.

The thermistor 170 mounted on the circuit board C may extend from one end portion of the thermistor lead 171 connected to the circuit board C toward the first battery cell B1, and thus, the thermistor chip 175 formed at the other end portion may contact the first battery cell B1 or may contact at least the first battery cell B1. In such an embodiment, the thermistor 170 may allow the thermistor chip 175 to contact or approach (e.g., be near to) the first battery cell B1 in a manner that presses the circuit board C toward the first battery cell B1 on one side of the circuit board C. As described above, the thermistor 170 may be mounted in a manner that presses the circuit board C toward the first battery cell B1 on one side of the circuit board C, and thus, the thermistor 170 may be mounted more easily than the method of pressing the circuit board C toward the first and second battery cells B1 and B2 on both sides of the circuit board C. Further, only temperature information of one group of battery cells B, that is, the group of first battery cells B1, may be selectively obtained from among the groups of first and second battery cells B1 and B2 by considering easy mounting of the thermistor 170. In order for the thermistor 170 to obtain temperature information of all the first and second battery cells B1 and B2, the circuit board C need not be pressed toward the battery cells B1 and B2 on both sides of the circuit board C when mounting the thermistor 170, and thus, workability for mounting the thermistor 170 may be reduced. In some embodiments, thermal grease (e.g., thermal silicone) for reducing thermal resistance with the first battery cell B1 may be formed around the thermistor chip 175.

The thermistor 170 may be provided at a height close to an upper end portion of the circuit board C rather than at a lower end portion of the circuit board C along the third axis Z3. The thermistor 170 may be provided at a height close to the upper end portion of the circuit board C rather than the lower end portion of the circuit board C on which a cooling plate 130 (see, e.g., FIG. 1) is arranged to detect accurate temperature information of the first battery cell B1, and for example, the thermistor lead 171 of the thermistors 170 connected to the circuit board C may be provided at a height close to the upper end portion of the circuit board C rather than the lower end portion of the circuit board C. Accordingly, the thermistor 170 may accurately detect a temperature of the first battery cell B1 without a detection error due to the cooling plate 130 (see, e.g., FIG. 1). For example, in one embodiment of the present disclosure, the cooling plate 130 (see, e.g., FIG. 1) may be formed adjacent to the lower end portion of the circuit board C rather than the upper end portion of the circuit board C along the third axis Z3 along which the first battery cell B1 extends, and the thermistor 170 may be provided at a height close to the upper end portion of the circuit board C to reduce the detection error due to the cooling plate 130 (see, e.g., FIG. 1).

Figure 12:
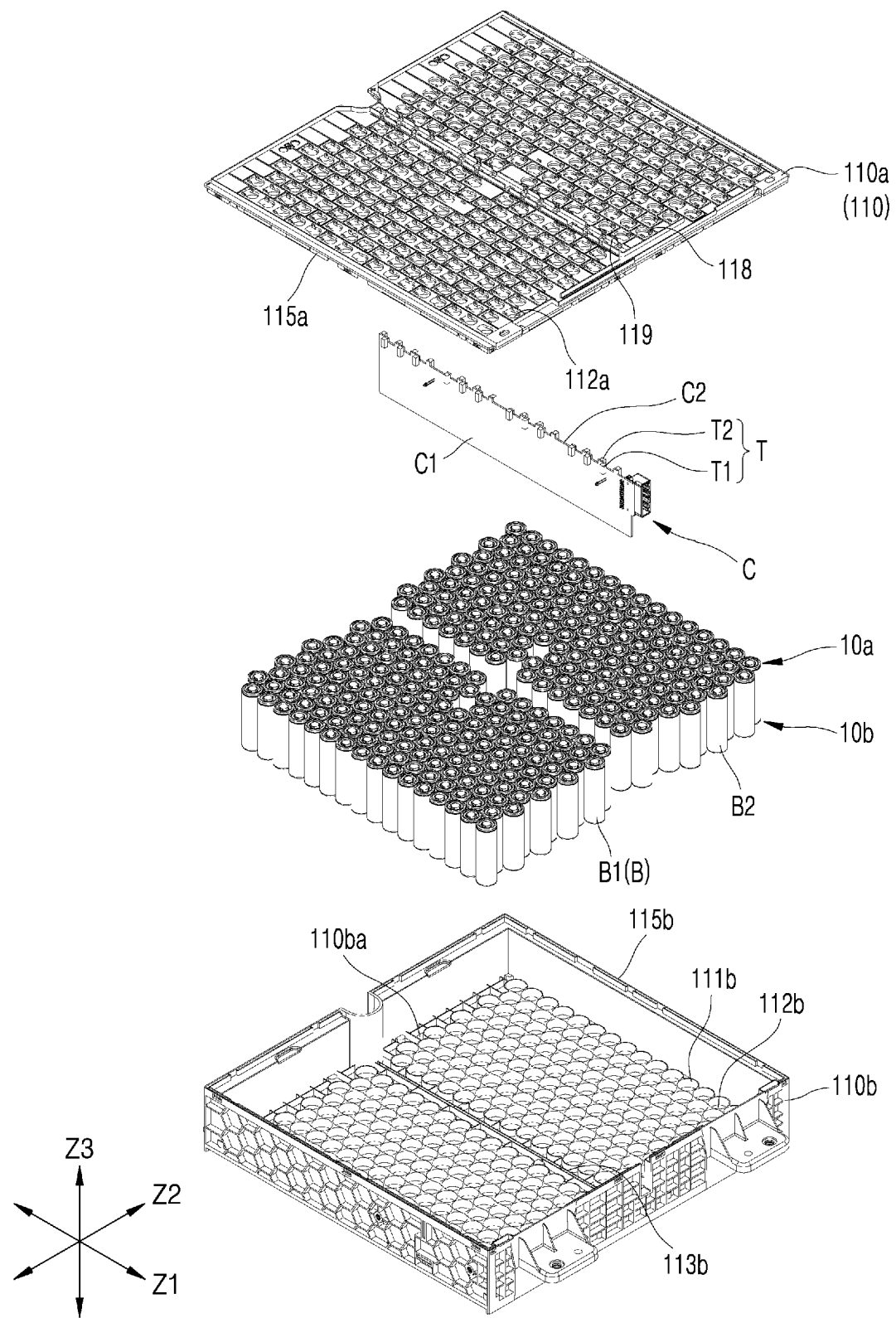
FIG. 12 is an exploded perspective view illustrating an assembly of cell holders and battery cells shown in FIG. 1.
Figure 13:
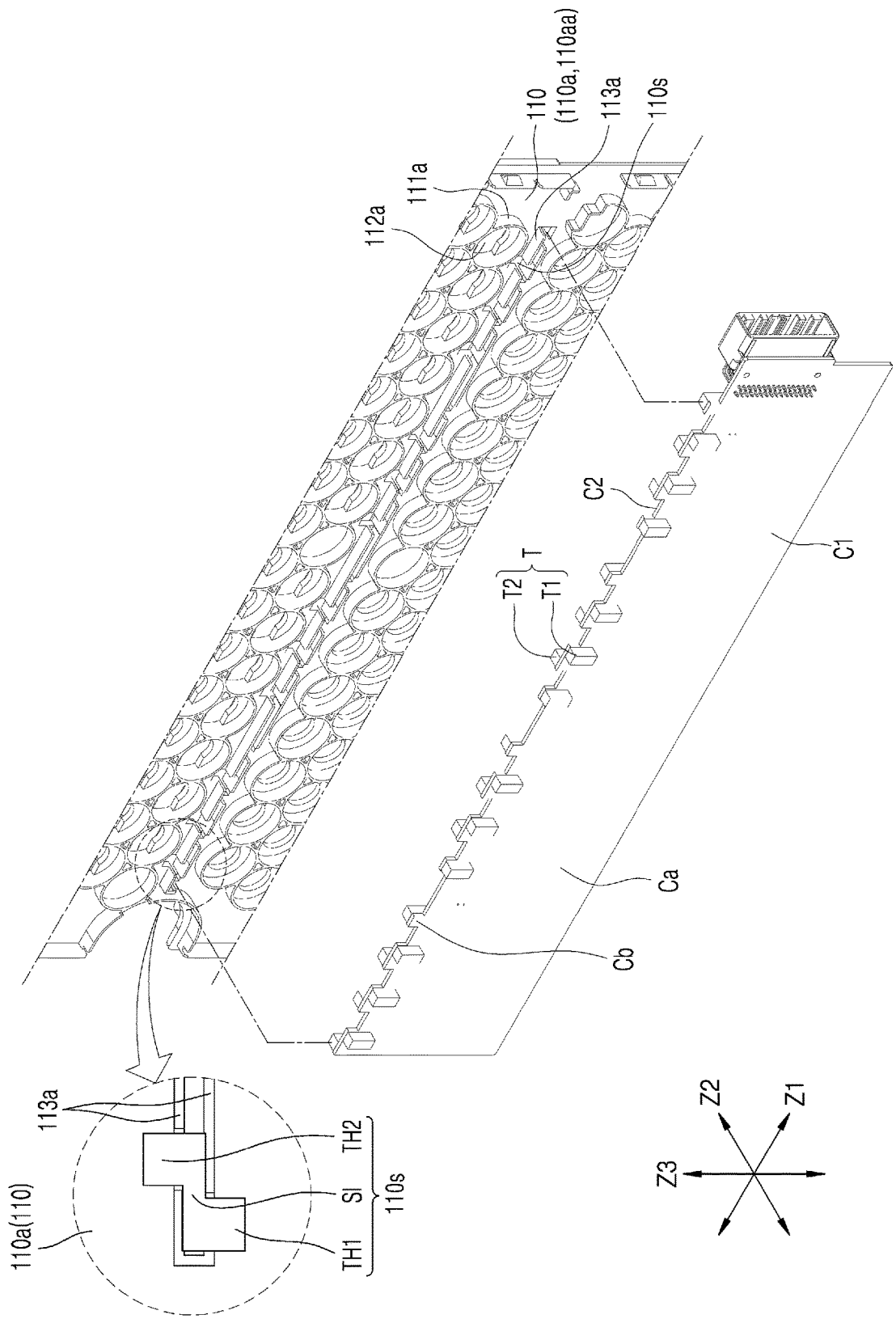
FIG. 13 is an exploded perspective view illustrating an assembly of cell holders and a circuit board shown in FIG. 12.
Figure 14:
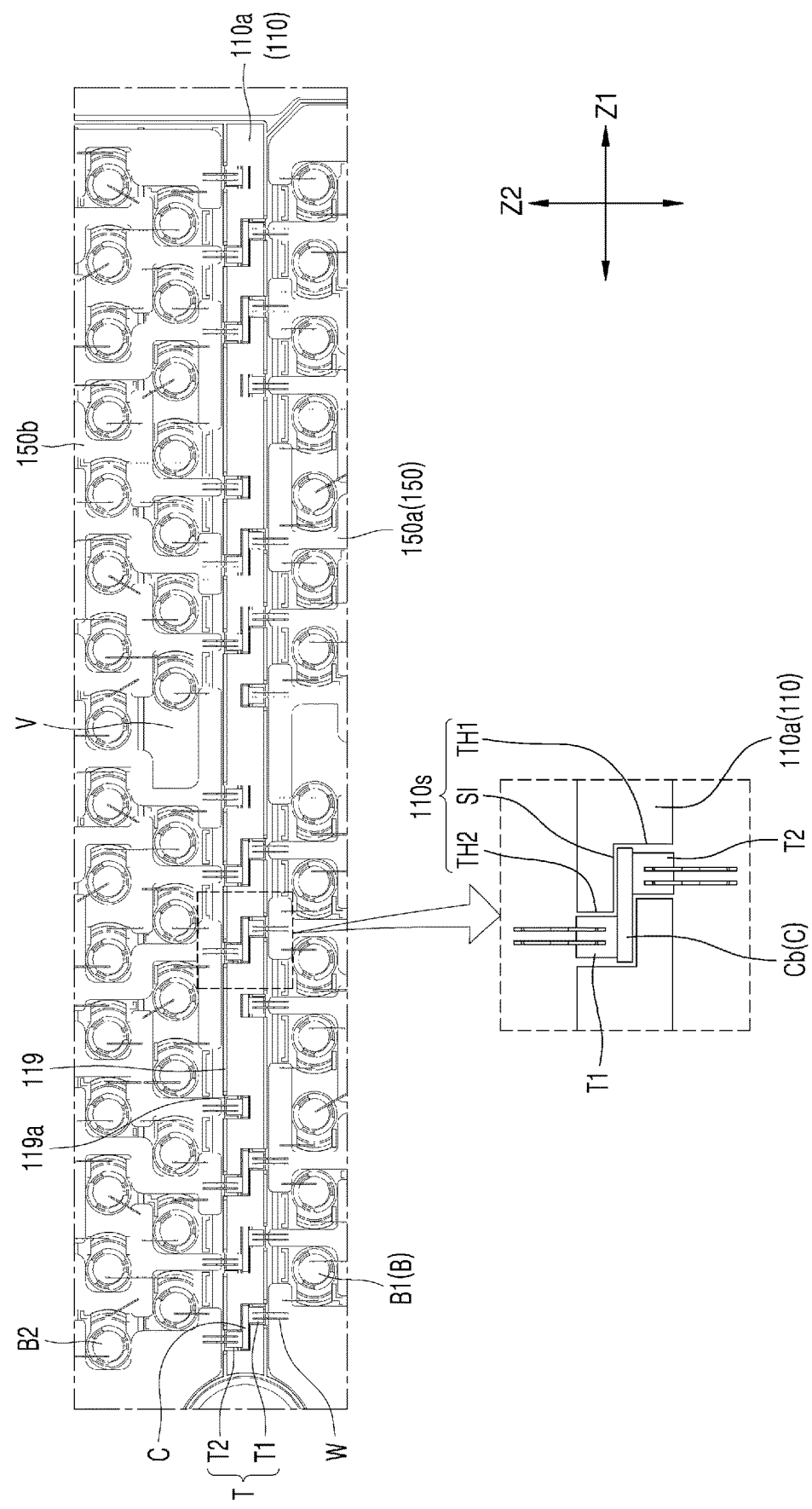
FIG. 14 is a view illustrating sensing holes of cell holders.

FIG. 12 is an exploded perspective view illustrating an assembly of the cell holders and the battery cells shown in FIG. 1, FIG. 13 is an exploded perspective view illustrating an assembly of the cell holders and the circuit board shown in FIG. 12, and FIG. 14 is a view illustrating sensing holes (e.g., sensing openings) in the cell holders.

Referring to the drawings, the battery cell B may be fitted into the cell holder 110, and an assembly position of the battery cell B may be regulated while the battery cell B is fitted into the cell holder 110 to be assembled. For example, the cell holder 110 may include an upper holder 110a into which the upper end portions 10a of the battery cells B are fitted and a lower holder 110b into which the lower end portions 10b of the battery cells B are fitted.

The upper holder 110a may include an upper holder body 110aa extending across upper end portions of the battery cells B and the circuit board C, upper cell assembly ribs 111a that protrude from the upper holder body 110aa toward the battery cells B and surround (e.g., extend around a periphery of) the upper end portions 10a of the battery cells B, upper board assembly ribs 113a that protrude from the upper holder body 110aa toward the circuit board C and surround (e.g., extend around a periphery of) the upper end portion of the circuit board C, and terminal holes (e.g., terminal openings) 112a for exposing the electrodes 11 and 12 formed on the upper end portions 10a of the battery cells B.

In one embodiment of the present disclosure, the upper holder body 110aa may be formed of a plate-shaped member extending across the upper end portions 10a of the battery cells B. As described below, in one embodiment of the present disclosure, most of an accommodation space for accommodating the multiple battery cells B and the circuit board C may be provided by the lower holder 110b, and the upper holder 110a may close one side of the accommodation space while being coupled to face the lower holder 110b. In one embodiment of the present disclosure, the upper holder 110a may have an approximately plate shape, and the lower holder 110b may have an approximately box shape.

The upper cell assembly ribs 111a may regulate assembly positions of the battery cells B while surrounding (e.g., extend around a periphery of) the upper end portions 10a of the battery cells B, and the terminal holes 112a for exposing the electrodes 11 and 12 formed in the upper end portions 10a of the battery cells B may be formed within the upper cell assembly ribs 111a. The electrodes 11 and 12 of the battery cell B exposed through the terminal hole 112a may be connected to the bus bar 150 through the connection member W. For example, the bus bar 150 may be on the upper holder 110a to be connected to the electrodes 11 and 12 of the battery cell B exposed through the terminal hole 112a in the upper holder 110a.

The upper cell assembly ribs 111a and the terminal holes 112a may be formed in first and second regions of the upper holder 110a in which a group of first battery cells B1 and a group of second battery cells B2 are arranged, and the upper board assembly ribs 113a may be formed in a third region of the upper holder 110a in which the circuit board C is between the first and second regions. The upper board assembly ribs 113a extend along the first axis Z1 to surround (e.g., extend around a periphery of) the upper end portion of the circuit board C and may regulate an assembly position of the circuit board C. For example, the upper board assembly ribs 113a may hold the circuit board C in place while surrounding a thickness between the first and second surfaces C1 and C2 of the circuit board C and may provide a groove into which the thickness of the circuit board C is fitted. In one embodiment of the present disclosure, the circuit board C may include the base portion Ca and the tab mounting portion Cb protruding upwardly from the base portion Ca along the third axis Z3, and a position of the base portion Ca may be fixed as the base portion Ca is fitted into the upper board assembly ribs 113a formed on a lower surface of the upper holder 110a to perform assembly. A position of the tab mounting portion Cb may be fixed as the tab mounting portion Cb penetrates (e.g., extends through) the sensing hole 110s of the upper holder 110a. That is, in one embodiment of the present disclosure, the upper board assembly ribs 113a may hold the upper end portion of the base portion Ca of the circuit board C.

In one embodiment of the present disclosure, the first and second regions in which the first and second battery cells B1 and B2 are arranged, and the third region in which the circuit board C is arranged, may be integrally formed at different positions in the upper holder 110a. An insulating wall 119 (see, e.g., FIG. 12) may be formed at a boundary of the third region of the upper holder 110a in which a circuit board C is arranged. For example, the insulating wall 119 may include a pair of insulating walls 119 including one insulating wall 119 at a boundary between the first and third regions and another insulating wall 119 at a boundary between the second and third regions. For example, the insulating wall 119 may include a pair of insulating walls 119 extending in parallel along the first axis Z1. The insulating wall 119 may be formed on an upper surface of the upper holder 110a along the third axis Z3 and may prevent interference between the circuit board C and the first and second bus bars 150a and 150b in the first and second regions on the upper surface of the upper holder 110a. For example, the first and second bus bars 150a and 150b may be aligned by the insulating wall 119 to prevent electrical interference with the circuit board C and so on through the insulating wall 119. In addition to the insulating wall 119, multiple alignment ribs 118 (see, e.g., FIG. 12) for alignment of the first and second bus bars 150a and 150b may be formed on the upper surface of the upper holder 110a. The alignment ribs 118 may extend along the first and second axes Z1 and Z2 on the upper surface of the upper holder 110a and may align the first and second bus bars 150a and 150b in place. For example, when the first and second bus bars 150a and 150b are out of position, the alignment rib 118 may prevent the first and second bus bars 150a and 150b from blocking the electrodes 11 and 12 of the first and second battery cells B1 and B2 exposed through the terminal holes 112a.

The insulating wall 119 extends along a boundary between the first and second regions and the third region, and in one embodiment of the present disclosure, through-grooves 119a (see, e.g., FIG. 14) may be formed in the insulating wall 119 to allow a connection between the first and second bus bars 150a and 150b in the first and second regions and the circuit board C (e.g., the first and second connection tabs T1 and T2 connected to the circuit board C) in the third region. The through-grooves 119a (see, e.g., FIG. 14) may be intermittently formed along the first axis Z1 at positions where the first and second connection tabs T1 and T2 are formed, and the detection connection members W (see, e.g., FIG. 14) extending across the first and second regions and the third region through the through-grooves 119a (see, e.g., FIG. 14) may connect the first and second connection tabs T1 and T2 to the first and second bus bars 150a and 150b. As the through holes are formed, the insulating wall 119 may be intermittently formed, rather than continuously formed, along the first axis Z1.

The upper holder 110a may include the insulating wall 119 extending in parallel along the first axis Z1 and the upper board assembly ribs 113a. The insulating wall 119 may be formed on an upper surface of the upper holder 110a opposite to the circuit board C, and the upper board assembly ribs 113a may be formed on a lower surface of the upper holder 110a facing the circuit board C. The circuit board C and the first and second connection tabs T1 and T2 connected to the circuit board C may be interposed between a pair of insulating walls 119, and a width between the pair of insulating walls 119 may be relatively great to accommodate all of a thickness between the first and second surfaces C1 and C2 of the circuit board C, the first connection tabs T1 formed on the first surface C1 of the circuit board C, and the second connection tabs T2 formed on the second surface C2 of the circuit board C. In addition, a width of the upper board assembly ribs 113a may be relatively small to accommodate the thickness between the first and second surfaces C1 and C2 of the circuit board C.

The insulating wall 119 and the upper board assembly ribs 113a may be intermittently formed, rather than continuously formed, along the first axis Z1. For example, the insulating wall 119 may have a form separated by the through-grooves 119a (see, e.g., FIG. 14) formed at the first and second connection tabs T1 and T2 along the first axis Z1, and the upper board assembly ribs 113a may be separated by slits SI that expose the tab mounting portions Cb on which the first and second connection tabs T1 and T2 are mounted along the first axis Z1. As described above, the insulating wall 119 and the upper board assembly ribs 113a may be respectively separated by the through-grooves 119a (see, e.g., FIG. 14) and the slits SI along the first axis Z1.

Referring to FIG. 12, the lower holder 110b may include a lower holder body 110ba extending across lower end portions of the battery cells B and the circuit board C, lower cell assembly ribs 111b that protrude from the lower holder body 110ba toward the battery cells B and surround (e.g., extend around a periphery of) the lower end portions 10*b* of the battery cells B, the lower board assembly ribs 113*b* that protrude from the lower holder body 110*ba* toward the circuit board C and surround (e.g., extend around a periphery of) the lower end portion of the circuit board C, and cooling holes (e.g., cooling openings) 112*b* for exposing at least part of the lower end portions 10*b* of the battery cells B.

In one embodiment of the present disclosure, the lower holder body 110*ba* may be formed of a box-shaped member including a surface extending across the lower end portions 10*b* of the battery cells B. In one embodiment of the present disclosure, the lower holder 110*b* may provide most of an accommodation space for accommodating multiple battery cells B and the circuit board C while having a box shape, and the upper holder 110*a* may close one side of the accommodation space while facing the lower holder 110*b*.

The lower cell assembly ribs 111*b* may regulate assembly positions of the battery cells B while surrounding (e.g., extend around a periphery of) the lower end portions 10*b* of the battery cells B, and the cooling holes 112*b* for exposing the lower end portions 10*b* of the battery cell B may be formed within the lower cell assembly ribs 111*b*. The cooling holes 112*b* may expose the lower end portions 10*b* of the battery cells B and increase cooling efficiency of the battery cells B by increasing thermal contact between the lower end portions 10*b* of the battery cells B exposed from the lower holder 110*b* through the cooling holes 112*b* and a cooling plate 130 (see, e.g., FIG. 1) under the lower holder 110*b*. In one embodiment of the present disclosure, the upper holder 110*a* and the lower holder 110*b* may be assembled to face each other with the battery cells B interposed therebetween along the third axis Z3. In addition, the cooling plate 130 (see, e.g., FIG. 1) may be under the lower holder 110*b*, and a heat transfer sheet 120 for facilitating heat transfer between the cooling plate 130 and the lower end portions 10*b* of the battery cells B exposed through the cooling holes 112*b* of the lower holder 110*b* may be between the lower holder 110*b* and the cooling plate 130. In addition, a cover 180 (see, e.g., FIG. 1) may be on the upper holder 110*a*.

The lower cell assembly ribs 111*b* and the cooling holes 112*b* may be formed in the first and second regions of the lower holder 110*b* in which a group of first battery cells B1 and a group of second battery cells B2 are arranged, and the lower board assembly rib 113*b* may be formed in the third region where the circuit board C is between the first and second regions. In one embodiment of the present disclosure, the first and second regions in which the first and second battery cells B1 and B2 are arranged and the third region in which the circuit board C is arranged may be integrally formed at different positions of the lower holder 110*b*.

The lower board assembly rib 113*b* may extend along the first axis Z1 to surround (e.g., extend around a periphery of) a lower end portion of the circuit board C and may regulate an assembly position of the circuit board C. The upper and lower end portions of the circuit board C may be fixed in place while being respectively fitted into the upper board assembly rib 113*a* and the lower board assembly rib 113*b*. For example, the cell holder 110 according to one embodiment of the present disclosure may fix not only positions of the battery cells B but also a position of the circuit board C. In one embodiment of the present disclosure, the upper board assembly rib 113*a* and the lower board assembly rib 113*b* may accommodate an adhesive for firmly fixing the circuit board C, and the upper board assembly rib 113*a* and the lower board assembly rib 113*b* may be respectively bonded to the upper end portion and the lower end portion of the circuit board C by the adhesive.

In one embodiment of the present disclosure, the upper holder 110*a* and the lower holder 110*b* may have a structure in which a first region at where a group of first battery cells B1 is arranged, a second region at where a group of second battery cells B2 is arranged, and a third region at where the circuit board C is arranged are integrally provided. For example, the third region where the circuit board C is arranged may extend along the first axis Z1 across the first region where the first battery cells B1 are arranged and the second region where the second battery cells B2 are arranged. The upper holder 110*a* and the lower holder 110*b* may be coupled to face each other along the third axis Z3, and an accommodation space in which a group of first battery cells B1 and a group of second battery cells B2 and the circuit board C are accommodated may be formed between are between the upper holder 110*a* and the lower holder 110*b*.

Referring to FIG. 12, an assembly structure between the upper holder 110*a* and the lower holder 110*b* may be formed along edges of the upper holder 110*a* and the lower holder 110*b*. For example, a holder assembly rib 115*a* may be formed in any one holder of the upper holder 110*a* and the lower holder 110*b*, and a holder assembly groove 115*b* into which the holder assembly rib 115*a* is fitted may be formed in the other holder thereof. In one embodiment of the present disclosure, to provide a firm bond between the upper holder 110*a* and the lower holder 110*b*, an adhesive may be between the holder assembly rib 115*a* and the holder assembly groove 115*b* respectively formed in the upper holder 110*a* and the lower holder 110*b*. For example, in a state in which the adhesive is accommodated in the holder assembly groove 115*b*, the holder assembly rib 115*a* may be fitted into the holder assembly groove 115*b* in which the adhesive is accommodated, and thus, an adhesive bond between the holder assembly groove 115*b* and the holder assembly rib 115*a* may be made.

Referring to FIGS. 13 and 14, the upper holder 110*a* may include the slits SI that expose the tab mounting portions Cb of the circuit board C, and the sensing holes 110*s* in which first and second tap holes (e.g., first and second tap openings) TH1 and TH2 are continuously formed to expose the first and second connection tabs T1 and T2 mounted in the tab mounting portions Cb of the circuit board C. The sensing holes 110*s* expose the first and second connection tabs T1 and T2, and thus, the first and second connection tabs T1 and T2 may be allowed to be connected to the first and second bus bars 150*a* and 150*b*, and the first and second connection tabs T1 and T2 exposed on the upper holder 110*a* through the sensing holes 110*s* may be allowed to be connected to the first and second bus bars 150*a* and 150*b* on the upper holder 110*a*.

The sensing holes 110*s* may be intermittently formed at locations spaced apart from each other along the first axis Z1 along which the circuit board C extends, and the sensing holes 110*s* may expose the tab mounting portions Cb of the circuit board C intermittently formed at locations spaced apart from each other along the first axis Z1 and the first and second connection tabs T1 and T2 mounted on the tab mounting portions Cb. For example, the sensing holes 110*s* each include the slit SI that exposes the tab mounting portion Cb of the circuit board C and the first and second tap holes TH1 and TH2 that expose the first and second connection tabs T1 and T2 mounted on the tab mounting portion Cb of the circuit board C, and the slits SI and the first and second tap holes TH1 and TH2 may be formed continuously.

In one embodiment of the present disclosure, the sensing holes 110s may be formed to include all the first and second tap holes TH1 and TH2 together with the slits SI or may include only one of the first and second tap holes TH1 and TH2. For example, the sensing holes 110s may expose the first and second connection tabs T1 and T2 mounted on the tab mounting portions Cb together with the tab mounting portions Cb of the circuit board C, and depending on positions of the tab mounting portions Cb along the first axis Z1, both the first and second connection tabs T1 and T2 may be mounted on some of the tab mounting portions Cb, while only one of the first and second connection tabs T1 and T2 may be mounted on each of the other tab mounting portions Cb, and depending on a difference in a configuration of the tab mounting portion Cb, some sensing holes 110s may each include both the first and second tap holes TH1 and TH2 together with the slit SI along the first axis Z1, while the other sensing holes 110s may each include only one tab hole TH of the first and second tap holes TH1 and TH2 together with the slit SI.

The slits SI of the sensing holes 110s may expose the tab mounting portions Cb of the circuit board C and may be formed along the first axis Z1. In addition, the first and second tap holes TH1 and TH2 of the sensing holes 110s may expose the first and second connection tabs TH1 and TH2 respectively formed on the first and second surfaces C1 and C2 of the tab mounting portions Cb, and the first and second tab holes TH1 and TH2 may extend in opposite directions from the slits SI along the second axis Z2. In one embodiment of the present disclosure, the first and second tap holes TH1 and TH2 may be formed at different positions along the first axis Z1. For example, the first and second tap holes TH1 and TH2 may be formed at opposite end portions of the slits SI along the first axis Z1. The first and second connection tabs T1 and T2 connected to the first and second surfaces C1 and C2 of the circuit board C may be formed at different positions of the circuit board C along the first axis Z1 to avoid interference with a soldering material and so on for connection to the circuit board C, and the first and second tap holes TH1 and TH2 for exposing the first and second connection tabs T1 and T2 formed at different positions along the first axis Z1 may also be formed at different positions along the first axis Z1. The first and second connection tabs T1 and T2 exposed through the first and second tab holes TH1 and TH2 may be respectively connected to the first and second bus bars 150a and 150b through the detection connection members W. The slits SI of the sensing holes 110s may expose the tab mounting portions Cb of the circuit board C, and the upper board assembly ribs 113a that hold a thickness of the circuit board C may be spaced apart from each other through the slits SI, and the upper board assembly ribs 113a may be intermittently formed through the slits SI along the first axis Z1 without being continuously formed along the first axis Z1.

The upper holder 110a and the lower holder 110b may be formed to have different heights along the third axis Z3. In one embodiment of the present disclosure, the upper holder 110a may be formed substantially in a plate shape, and the lower holder 110b may be formed substantially in a box shape. For example, an accommodating space in which the battery cells B and the circuit board C are accommodated together may be provided by the lower holder 110b formed substantially in a box shape, and the upper holder 110a formed in a plate shape may perform a cover function to close the accommodation space of the lower holder 110b. In one embodiment of the present disclosure, a height of the lower holder 110b may be greater than a height of the upper holder 110a.

Referring to FIG. 13, the upper board assembly ribs 113a that surround an upper end portion of the circuit board C along the first axis Z1 of the circuit board C and the slits SI that expose the upper end portion of the circuit board C may be alternately formed in the upper holder 110a. In one embodiment of the present disclosure, the base portion Ca and the tab mounting portions Cb may be alternately arranged on the upper end portion of the circuit board C along the first axis Z1, and thus, the upper board assembly ribs 113a that maintain a thickness of the base portion Ca along the first axis Z1 and the slits SI that expose the tab mounting portion Cb may be alternately formed in the upper holder 110a. For example, the upper board assembly ribs 113a for fixing a position of the circuit board C may be formed in a portion of the upper holder 110a in which the slits SI are not formed, that is, in a portion that covers the upper end portion of the circuit board C. Because the upper holder 110a exposes the upper end portion of the circuit board C through the slits SI, the first and second connection tabs T1 and T2 connected to the circuit board C may be connected to the detection connection members W and a position of the circuit board C may be fixed through the upper board assembly ribs 113a formed in the portion that covers the upper end portion of the circuit board C.

Referring to FIG. 1, in an embodiment of the present disclosure, the bus bar 150 may be fixed on the upper holder 110a. In some embodiments, an adhesive may be applied on the upper holder 110a, and while the bus bar 150 is safely placed on the upper holder 110a on which the adhesive is applied, the first and second bus bars 150a and 150b may be respectively fixed on an upper surface of the upper holder 110a, that is, on the first and second regions of the upper holder 110a. For example, the upper holder 110a and the first and second bus bars 150a and 150b may be bonded by an adhesive interposed therebetween.

A potting resin may be filled on the upper holder 110a to which the bus bar 150 is fixed. The potting resin filled on the upper holder 110a may fix a position of the connection member W together with the bus bar 150 while burying the connection member W connected to the bus bars 150, and thus, a short circuit or disconnection due to movement of the connection member W according to an external impact or vibration may be prevented (or substantially prevented), and the connection member W may be insulated from the external environment.

According to the present disclosure, a battery pack is provided that has an improved sensing structure for obtaining state information of battery cells, such as voltages, currents, and temperatures of the battery cells.

It should be understood that the embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims and their equivalents.

What is claimed is:

1. A battery pack comprising:

plurality of battery cells comprising a first battery cell and a second battery cell, the first and second battery cells respectively extending in a third axis;

a first bus bar connected to the first battery cell by a first connection member, the first connection member being connected to an upper surface of the first bus bar in the third axis and connected to an upper end of the first battery cell in the third axis;

a second bus bar connected to the second battery cell by a second connection member, a circuit board electrically connected to the first battery cell and the second battery cell and extending along a first axis crossing the third axis, a first surface of the circuit board facing the first battery cell;

a first connection tab protruding from the first surface of the circuit board toward the first battery cell along a second axis crossing the first axis and the third axis;

a second connection tab protruding from a second surface of the circuit board, the second surface being opposite to the first surface of the circuit board and facing toward the second battery cell along the second axis;

a first detection connection member connecting the first connection tab to the first bus bar, the first detection connection member being connected to the upper surface of the first bus bar in the third axis and connected to an upper end of the first connection tab in the third axis;

a second detection connection member connecting the second connection tab to the second battery cell; and wherein each of the first connection member, the second connection member, the first detection connection member, and the second detection connection member are a conductive ribbon or a conductive wire.

2. The battery pack of claim 1, wherein the first connection tab has a fixing surface coupled to the first surface of the circuit board and a coupling surface contacting the fixing surface at one edge and being an uppermost surface of the first connection tab along the third axis.

3. The battery pack of claim 1, wherein the circuit board is vertically arranged along the third axis.

4. The battery pack of claim 1, wherein the first detection connection member has one end portion bonded to the first connection tab and another end portion bonded to the first bus bar connected to the first battery cell.

5. The battery pack of claim 4, wherein the first bus bar is on the first battery cell along the third axis, and wherein the first connection tab is connected to a tab mounting portion of the circuit board which protrudes upwardly along the third axis.

6. The battery pack of claim 4, wherein the first battery cell comprises a plurality of first battery cells arranged in a zigzag pattern along the second axis at a position adjacent to the first surface of the circuit board, and wherein the first bus bar connects the first battery cells arranged in the zigzag pattern to each other in parallel along the second axis to form a first parallel module.

7. The battery pack of claim 6, wherein the first parallel module comprises:

first and second parallel connections that connect, in parallel, ones of the first battery cells in a preceding row to other ones of the first battery cells in a following row along the second axis; and a third parallel connection that connects, in parallel, ones of the first battery cells in the same row along the first axis.

8. The battery pack of claim 6, wherein different first parallel modules connected to the circuit board through different detection connection members are arranged at different positions along the first axis.

9. The battery pack of claim 8, wherein different first parallel modules arranged along the first axis are connected to each other in series.

10. The battery pack of claim 1, wherein the circuit board is upright between the first and second battery cells, and wherein the first and second connection tabs protrude from the first and second surfaces of the circuit board toward the first and second battery cells in opposite directions.

11. The battery pack of claim 10, wherein the first and second connection tabs are connected to different positions of the circuit board along the first axis.

12. The battery pack of claim 1, wherein the second detection connection member has one end portion bonded to the second connection tab and another end portion bonded to the second bus bar connected to the second battery cell.

13. The battery pack of claim 1, further comprising a cell holder into which the first and second battery cells are fitted, wherein the cell holder comprises a board assembly rib for fixing a position of the circuit board.

14. The battery pack of claim 13, wherein the cell holder has slits, each exposing a tab mounting portion of the circuit board to which the first and second connection tabs are connected, the slits being formed at positions away from each other along the first axis, and wherein the board assembly rib and the slits are formed at alternating positions along the first axis.

15. The battery pack of claim 14, wherein the cell holder further comprises first and second tap openings that extend from the slits along the first and second connection tabs opposite to each other along the second axis to expose the first and second connection tabs.

16. The battery pack of claim 15, wherein the first and second tap openings are formed at different positions in the slits along the first axis.

17. The battery pack of claim 1, further comprising a thermistor for selectively detecting temperature information of the first battery cell among the first and second battery cells is connected to the circuit board, wherein the circuit board is between the first and second battery cells.

18. The battery pack of claim 17, wherein the thermistor is at a height relatively close to an upper end portion of the circuit board and relatively far from a lower end portion of the circuit board along the third axis along which the first battery cell extends.

19. The battery pack of claim 18, further comprising a cooling plate configured to cool the first battery cell, wherein the cooling plate is arranged at a height relatively close to the lower end portion of the circuit board and relatively far from the upper end portion along the third axis.

* * * * *

UNITED STATES PATENT AND TRADEMARK OFFICE
CERTIFICATE OF CORRECTION

PATENT NO. : 12,176,581 B2
APPLICATION NO. : 17/452892
DATED : December 24, 2024
INVENTOR(S) : Byungkook Ahn et al.

Page 1 of 1

It is certified that error appears in the above-identified patent and that said Letters Patent is hereby corrected as shown below:

In the Claims

In Column 27, Line 1, in Claim 1, before "plurality" insert -- a --.

Signed and Sealed this
Eighth Day of July, 2025

Coke Morgan Stewart
*Acting Director of the United States Patent and Trademark Office*